(12) United States Patent
Balinsky et al.

(10) Patent No.: US 8,560,846 B2
(45) Date of Patent: Oct. 15, 2013

(54) DOCUMENT SECURITY SYSTEM AND METHOD

(75) Inventors: Helen Balinsky, Cardiff (GB); Steven J. Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 253 days.

(21) Appl. No.: 13/006,147

(22) Filed: Jan. 13, 2011

(65) Prior Publication Data

US 2012/0185701 A1    Jul. 19, 2012

(51) Int. Cl.
*H04L 29/06* (2006.01)
*G06F 21/00* (2013.01)

(52) U.S. Cl.
USPC ............................. 713/165; 713/176; 726/27

(58) Field of Classification Search
None
See application file for complete search history.

(56) References Cited

U.S. PATENT DOCUMENTS

| | | | |
|---|---|---|---|
| 6,067,551 A | 5/2000 | Brown et al. | |
| 2004/0083433 A1 | 4/2004 | Takeya | |
| 2004/0117737 A1 | 6/2004 | Bera | |
| 2004/0135805 A1 | 7/2004 | Gottsacker et al. | |
| 2005/0097056 A1* | 5/2005 | DeMello et al. | 705/57 |
| 2005/0120199 A1* | 6/2005 | Carter | 713/150 |
| 2005/0142526 A1* | 6/2005 | Haruyama et al. | 434/307 A |
| 2006/0047977 A1 | 3/2006 | Hanasaki | |
| 2007/0186157 A1 | 8/2007 | Walker et al. | |
| 2008/0028300 A1 | 1/2008 | Krieger et al. | |
| 2009/0150761 A1 | 6/2009 | Sawicki et al. | |
| 2009/0288150 A1 | 11/2009 | Toomim et al. | |
| 2009/0313331 A1 | 12/2009 | Rasmussen et al. | |
| 2010/0046749 A1 | 2/2010 | Hatano et al. | |
| 2010/0174783 A1 | 7/2010 | Zarom | |

FOREIGN PATENT DOCUMENTS

| | | |
|---|---|---|
| WO | PCT/US10/49638 | 9/2010 |
| WO | PCT/US10/49669 | 9/2010 |

OTHER PUBLICATIONS

U.S. Appl. No. 12/949,510, filed Nov. 18, 2010, Balinsky et al.
Balinsky, Helen, et al., "Publicly Posted Composite Documents," (Power Point Slides) ACM DocEng 2010, Manchester UK, Sep. 21-24, 2010.
Balinsky, Helen Y., et al., "Differential Access for Publicly-Posted Composite Documents with Multiple Workflow Participants," (Article) ACM DocEng '10, Manchester, UK, Sep. 21-24, 2010.
Adobe Systems Incorporated, "A Primer on Electronic Document Security," Technical Whitepaper, pp. 1-14, 2007.
Dridi, Fredj, et al., "Towards Access Control for Logical Document Structures," Proceedings of the Ninth International Workshop on Database and Expert Systems Applications, DEXA 98, pp. 322-327, Vienna, Austria, Aug. 1998.
Chou, Seng-Cho T., "Managing Multi-party Documents in a Network Computing Environment," Software-Practice and Experience, vol. 28(12), pp. 1315-1325, Oct. 1998.

(Continued)

*Primary Examiner* — Gilberto Barron, Jr.
*Assistant Examiner* — Izunna Okeke

(57) ABSTRACT

A method and system for document security are described. The method decrypts a key-map file located a composite document with embedded access control, decrypts a content part from the composite document with embedded access control, wherein the key-map file provides a key to access the content part, loads the content part in decrypted form into a document serialization maintained in a transient memory where the content part in decrypted form is maintained exclusively in the transient memory, and erases the content part in decrypted form upon termination of a program to access the decrypted content part from the document serialization.

18 Claims, 13 Drawing Sheets

(56) References Cited

OTHER PUBLICATIONS

Brainloop AG Product Data Sheet, "Brainloop Outlook Add-In + Send-To," http://www.brainloop.com/products/resources.html, publicly available on or after Sep. 4, 2009.
Website print-out as support for Sep. 4, 2009 (available as of Jan. 12, 2011 at http://www.brainloop.com/de/products/search.html).
Web browser screen shot as additional Support for Sep. 4, 2009 (screen shot image available as of Jan. 12, 2011 at http://www.brainloop.com/de/products/search.html).
Brainloop AG Product Data Sheet, "Brainloop Secure Dataroom Service 8.0," http://www.brainloop.com/products/resources.html, publicly available on or after Aug. 3, 2010.
Website print-out as support for Aug. 3, 2010 (available as of Jan. 12, 2011 at http://www.brainloop.com/de/products/search.html).
Web browser screen shot as additional support for the Aug. 3, 2010 (screen shot image available as of Jan. 12, 2011 at http://www.brainloop.com/de/products/search.html).
Brainloop AG (Michael Rasmussen), White Paper, "Managing Information Risk in the Extended Enterprise: Why Corporate Compliance & IT Security Must Join Forces," www.brainloop.com, Nov. 1, 2010.
Brainloop Press Release, "Brainloop Publishes New White Paper on Managing Document Security," to support Nov. 1, 2010 (available as of Jan. 7, 2011 at www.brainloop.com/news-events/press-releases/press-releases/backpid/99/article/brainloop-publishes-new-white-paper-onmanaging-document-securitybr-managing-information-risk-in.html?type=98).
Ignat, Claudia-Lavinia, et al., "Operation-based Versus State-based Merging in Asynchronous Graphical Collaborative Editing," Sixth International Workshop on Collaborative Editing Systems, CSCW'04, IEE Distributed Systems online, available at http://www.loria.fr/~ignatcla/pmwiki/pub/papers/IgnatCEW04.pdf, Nov. 2004.
Publication data (available as of Jan. 21, 2011) obtained from website, http://www.loria.fr, as support for Nov. 2004.

\* cited by examiner

DOCUMENT SECURITY SYSTEM AND METHOD

BACKGROUND

Security for computer documents accessed by multiple computer users in multiple locations may be an important concern for businesses and other organizations, particularly where documents are created through collaborative processes, like multi-party, multi-organization document workflows.

In such collaborative processes, which can vary in nature widely (from contract reviews, to research grant proposal submissions, to shareholder presentations, etc.) multiple users (e.g. in many different locations) may contribute material to a document or revise the document's content. In a large organization, users in a collaboration may be located all over the world. Collaborative processes can also take place between organizations. In such settings, users from several different organizations may access the same document.

In each of these situations, the security protections available on the computers of the users may vary widely. To an organization such as a business, much of the information contained in a document may be considered private or confidential. Some of the information may be extremely sensitive. Access by multiple users in different locations, where users may not belong to the same organization and/or where users may access through unsecured computer systems, creates a risk that sensitive or otherwise confidential information contained in the documents may be compromised.

Another concern in a collaborative process may be with authenticity. Issues of authenticity cover both the user accessing a document and the document itself. "Hackers" and other users who may be unauthorized (and who even may be posing as authorized users) may gain to access a document. Where unauthorized access has been made, the integrity of the document, and its genuineness, may also be compromised.

Issues of security may be more complex when the document accessed (in a collaborative process or other process) is made of parts such as a separately-editable text and images.

Figure 1:
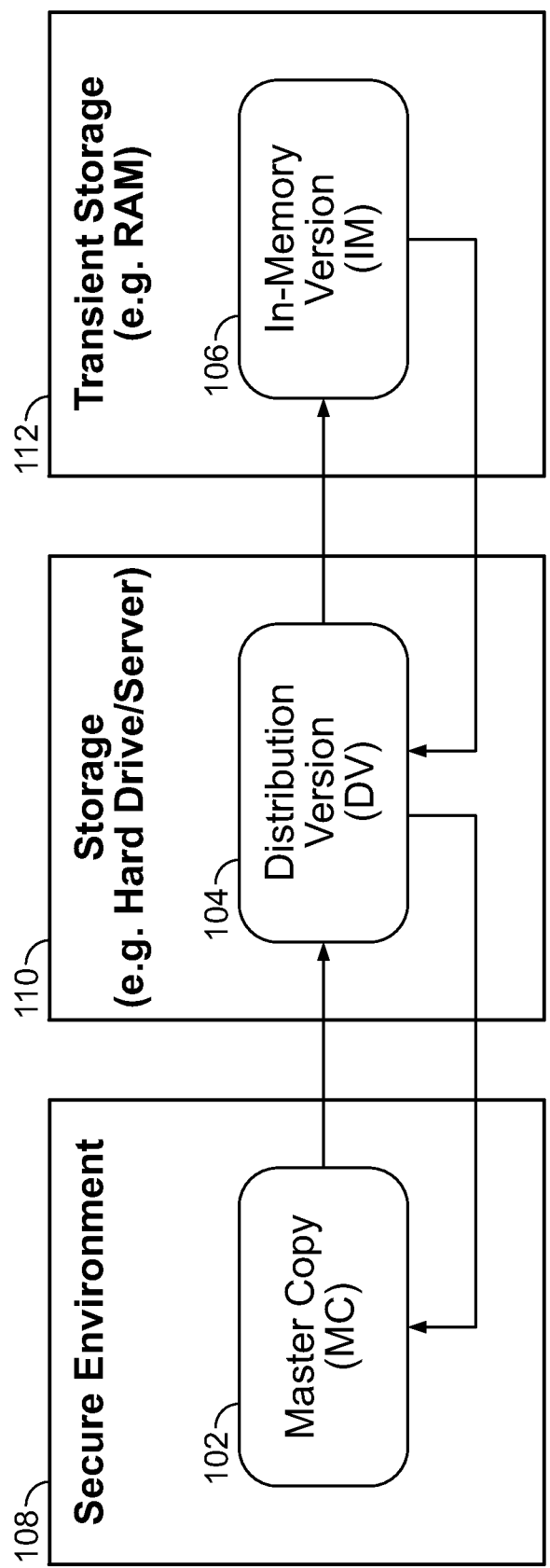
FIG. 1 is an illustration showing elements of a document security system, according to an embodiment of the invention.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of different embodiments of the invention. However, it will be understood by those of ordinary skill in the art that embodiments of the present invention may be practiced without these specific details. In other instances, well-known methods, procedures, components, and circuits have not been described in detail so as not to obscure the present invention.

An embodiment of the present invention may provide a system and method for document security in a multi-user environment, where, for example, users access the document from multiple locations that may not be secure. The document may exist in forms of a master copy (MC), a distribution version (DV) and transient, in-memory versions (IMs). IMs may be created for each user's access and erased when that access is completed. The users may access the document according to a document workflow.

A document workflow (or "workflow") may be a sequence of accesses by a person or a group of persons, or one or more automatic services that for example either contribute to the content of a document (or a process related to the document) or allow person(s) to familiarize themselves with some part of the document's contents. Contributions to the document or a process related to the document can vary from, for example, active editing of the document's content to filling in blanks or completing information requests in the document (e.g. as a form), to simply registering an incoming document (e.g. at a location).

Document workflows may not be contained within a single secure and trusted environment (such as within a single company or other organization). Instead, some document workflows considered herein may cross the boundaries of different organizations. In such document workflow situations, it may be difficult or even impossible to create a shared document space, manage the workflow centrally and/or create an access controller simultaneously trusted by all parties.

Document workflows, which can be ad hoc or planned, regular or non-standard, occasional or frequent, inter- or intra-organization, etc., may often carry high sensitivity data distributed over potentially non-secure communication channels such as by e-mail or on disk, placed in a public cloud (e.g. for public, Internet-based computing)

Document workflows may further involve virtual organizations, with different document participants located in different locations. These participants often have different access rights and the documents themselves are comprised of parts with heterogeneous access sensitivities. As economies, geo-political focus, communication and workflow networks, etc. become increasingly globalized, collaborative document workflows more and more may cross the boundaries of businesses, academic institutions, government organizations, countries and continents.

When a document workflow is not contained within the same organization, it is often impossible/impractical to provide access for workflow participants to the internal system where the MC (master copy) is created. As stated, the document is often sent between organizations over low security communication channels: e.g., the document may be e-mailed, posted on CD/DVD or provided on a USB memory device or posted on other devices having no firewall or other security.

A secured DV (distribution version) of a document may need to be generated from a corresponding MC (master copy), particularly where a document is being distributed in open (low security) environments. The DV may be a version of an MC that is designed to be distributed over traditional low-security communication channels while delivering all data to workflow participants according to the granted access.

The DV may be delivered to users (e.g. over non-secure communication channels) and may be accessed on shared devices. The DV may be stored in memory that is not secure, such as on the hard drive of the computer of a user accessing the document, or on an unsecured network server. Other security measures can also be used, such as for example only allowing a part of a document to be viewed at a time if it is known that the security will be compromised by viewing the document as a whole.

The DV in such an example may be capable of withstanding hazards (attacks) characteristic of an unprotected environment (e.g. where unauthorized modification may be immediately detected by the following workflow participant). The DV may be a specially constructed document with a pre-defined structure. The DV may further ensure that only authorized users (e.g. authorized workflow participants) may access the document or its constituent parts according to the user's granted access rights. Such differential access may be maintained, for example, through a set of key-map files (user-specific access keys) and an entry table (a table for locating the key-map file(s) for a particular user while maintaining user anonymity), included in the DV.

An MC (which may originate a DV) may be a composite document and the DV created from such an MC may be a composite document (e.g. such as a document referred to as a Publicly-Posted Composite Document (PPCD) generated from systems developed by the Hewlett-Packard Company of Palo Alto, Calif.), where the DV includes an embedded mechanism for access control.

As used herein a "composite document" may be a document having a set of individually accessible (e.g. separately addressable) content parts. In an embodiment, content parts may include components (files), sub-components (file fragments) and/or component/subcomponent (file/file fragment) groups (e.g. called "tessellations," which may be encrypted together and maintained in the DV as a single content part). Where the document is a composite document, the DV may ensure that each content part may be accessed only by persons who are authorized to view/edit them. A "component" (or "file") may be any digital object (e.g. a file) and may include, for example, text files (e.g. *.txt files), word processing program files (such as *.doc files from Word™ by Microsoft of Redmond, Wash. or *.wpd files from WordPerfect™ by Corel of Ottawa, Canada), spreadsheet program files (such as *.xls files from Excel™ by Microsoft), presentation program files (such as *.ppt files from PowerPoint™ by Microsoft) or files such as a Portable Document Format (PDF) files (e.g. *.pdf file). A component may also include any image format file, such as for example Joint Photographic Experts Group (JPEG) (e.g. *.jpg) files, Tagged Image File Format (TIFF) (e.g. *.tif) files, Portable Network Graphics (PNG) (e.g. *.png) files or Graphics Interchange (GIF) format (e.g. *.gif) files. Further, any video format file (*.mov, *.mpeg), any audio format file such as a MPEG-1, MPEG-2 standard (e.g. *.mp3) file, or any style file, such as a Cascading Style Sheet (e.g. *.css) file may also be a component. The list above is not exhaustive and other types of files for digital objects can also serve as a component (file) in a composite document.

Sub-components (file fragments) may be individually accessible (e.g. separately addressable) units of a component, such as, for example, the fields, columns or rows in a spreadsheet file, "nodes" in a hypertext mark-up language file (HTML) (*.html, *.htm file), "nodes" from an extensible mark-up language (XML) (*.xml file), a text box or table in a word processing file, a presentation slide (e.g. from a *.ppt file) or other unit of a digital object. Sub-components may have their own access requirements and their own encryption and security keys, separate from the parent-component file. Components and sub-components may have ordered relationships, and when combined together they may create a "one-document" appearance, for example, by providing cross navigation components (e.g. hyperlinks or navigation bars), or by embedding or combining components together to form a page (e.g. by a layout engine).

Components and sub-components may be considered "atomic units" within a composite document, as they may be the smallest units of individually accessible (e.g. addressable) content in the document. As may be seen, the file types for components and sub-components may vary widely. Thus, a composite document may include components and sub-components having the same file format or file formats that are different from each other. The atomic units (components and sub-components) may also be assigned different policies for different users (e.g. different workflow participants). The same atomic unit (component or sub-component) may be assigned a first security access policy for a first user and a second security access policy for a second user. For example, one user may be given "read/write" (RW) access for a content part and be asked (as part of a workflow) to modify the content part, while the other user could be granted "read only" (RO) access to the same part and may be able only to familiarize him- or herself with the part contents. A third user may be granted "no access" (NA) to the same content part and this user may not have read or write access (or be able to view at all) the content part.

Components and sub-components (atomic units) that require the same security access may also be aggregated or grouped in an embodiment into super-component-groups (or "tessellations") to reduce the number of content parts in a composite document.

Where the composite document includes components and subcomponents as atomic units, combinations of components and/or subcomponents can also be grouped into tessellations (according to access policy). These atomic unit groups (e.g. groups of components and/or subcomponents) may be aggregated for security (encryption) and are reassembled when decrypted. As each user (or workflow participant) attempts to access the DV (or a copy of the DV), a transient in-memory version (IM) of the DV may be created by an application accessing the DV. A document interface, for example, provided as part of an application program, may generate an IM from a DV according to a particular user's access rights. An IM (in-memory version) may provide decrypted ("cleartext") versions of those parts of the document that are accessible to the user (e.g. components, sub-components tessellations, etc.). A user may provide input to the document (e.g. adding, deleting or editing content) through the GUI/application interacting with the IM (the application having exclusive access to the memory containing the IM).

When the user makes changes to the document, he or she may make the changes to the decrypted parts available in the IM. When the user completes an editing session, the document interface (e.g. accessed by an application program) may update the DV. A clear text content part may be encrypted by a corresponding encryption key and then may be signed by a corresponding signature key. Both operations of encrypting and signing may be done in transient memory. The content part, for example, may be signed using a specially assigned content part signature key the user (or workflow participant) may recover (with encryption keys) from a key-map entry in the DV. The encrypted and signed content part may then be replaced into the DV.

The DV may originate from the MC and the DV may have a lifecycle traveling from user to user (or where each user accesses one copy of the DV in turn). On each user access of the DV, each user may create his or her own IM, make changes to the document through the IM, and check the changes back into the DV in an encrypted form. When all the users have completed accessing the document (e.g. with each user accessing through an IM generated from a DV), the DV may be re-imported back into the original secure environment. The DV may then be merged with the MC to create an updated MC Multiple copies of a DV may also be created, where, for example, each workflow participant may receive their own copy of the DV to access content (read, edit, etc.) according to their access privileges.

An embodiment of the invention may provide that each user (e.g. each workflow participant) may receive exclusive access to the unencrypted data when he or she runs an application (e.g. using a document interface) to view the DV material through the IM.

An embodiment of the invention may further provide that clear-text data (unencrypted forms of content from a DV) may not be left behind on a computer after either a normal application exit or an accidental or malicious crash. Safe-handling of data may be ensured, for example, where all decrypted ("clear text") data and access keys from key-map entry are stored only in transient memory: the running application has an exclusive access to the content data in the IM.

For relatively small documents (or when a user is accessing a DV using a computer having a large amount of available processor or other transient memory, e.g. a large amount of random-access memory (RAM)), it may be possible to keep all of the decrypted content parts available to the user in transient memory, for a particular user access.

Where a document is large (for example where the document is a composite having many large component parts) or is accessed on a device with limited capabilities (e.g. mobile), not all content parts available to a user may be presented at once using the available transient memory (e.g. RAM). Different strategies may be employed to present decrypted content to the user, while maintaining safe-handling of the data, such that decrypted, "clear-text" data is not left behind on a computer after either a normal application exit or an accidental or malicious crash.

Many different structures may be used for composite document serialization (in the MC, DV and IM forms) including a structure with a relational database format. Serialization may be a process of converting a data structure or object into a bit sequence or format so that the data structure or object may be stored in a file. A document serialization may be the data structure or object used that leads to the storage file. A relational database format may provide a document serialization structure and a coherent way to handle relational data, needed for access, such as the content and permissions (e.g. in the key-map entries). A relational database format implemented through a database system library such as the SQLite™ library (available from the SQLite Development Team (www.sqlite.org)), may allow in-memory relational database access for retrieving permission and content information, for example. Further, Systems and methods for providing differential access to a digital document and systems and methods for application of differential policies to a digital document may be described in pending International Application Serial No. PCT/US2010/049638, titled "PROVIDING DIFFERENTIAL ACCESS TO A DIGITAL DOCUMENT", filed Sep. 21, 2010 and pending International Application Serial No. PCT/US2010/49669, titled "APPLICATION OF DIFFERENTIAL POLICIES TO AT LEAST ONE DIGITAL DOCUMENT", filed Sep. 21, 2010 which are each hereby incorporated by reference in their entirety.

One type of composite document format may be the *.pex composite format (from Hewlett-Packard Company of Palo Alto, Calif.). A *.pex documents may be aggregated as needed per a workflow. A .pex document may include one or more of typical document pieces, such as *.jpeg, *.pdf, *.doc, *.html, etc. files. With a *.pex document format, further component groups such as tessellations are also possible. A *.pex composite structure, for example, may include content-parts, each individually encrypted and signed and key-map files, e.g. one per each workflow participant per session. Alternatively, key-map files (or the user entries found in the key-map files) may, for example, be rolled into a workflow wrap or accompanied by an entry table. In an embodiment, a key-map file may grant document access to a workflow participant, but when there is a need to enforce a particular order of access, a key-map file for workflow participant K may be made unavailable until participant K−1 accesses. Such ordered access may be made through a workflow wrap. A workflow wrap or other technique for key-map file access using a secure digital document may be described in pending U.S. patent application Ser. No. 12/949,510, "MANAGING ACCESS TO A SECURE DIGITAL DOCUMENT", filed Nov. 18, 2010 hereby incorporated by reference in its entirety.

Document Lifecycle

Reference is made to FIG. 1, which illustrates a document security system, according to an embodiment of the invention. FIG. 1 depicts Master Copy (MC) 102, Distribution Version (DV) 104 and In-Memory Version (IM) 106.

MC 102 may be a version of a document, such as a composite document maintained in secure environment 108 away from general user access. Secured environment 108 may be a computer-environment where the required access control is enforced by an operating system (OS) or by a secure domain controller within the intranet of an organization/enterprise, that may prevent access to the MC by users (e.g. workflow participants) who are not employees of the organization. In such an example, the users (workflow participants) may have limited, or no access to MC 102. Access may be controlled for example by a system administrator or an electronic workflow system.

DV 104 may originate from MC 102. When one or more users (e.g. outside of an enterprise/organization) may wish (or may be required by a workflow) to access a document represented by MC 102, DV 104 may be generated from MC 102. For example, DV 104 may be automatically generated from MC 102 for a particular workflow.

DV (distribution version) 104 may be created, for example, for the purpose of being passed between different users (e.g. workflow participants). DV 104 may be crafted to embed an access control structure into its format. DV 104 may be created, for example, using the *.pex composite document structure format. DV 104 may be expected to transport between workflow participants by low security communication channels: e.g., sent by e-mail, posted on CD/DVD/USB, uploaded/downloaded from widely accessible servers, shared drives, etc.

A user (workflow participant) may receive a copy of DV 104, and DV 104 may be loaded onto storage 110 (e.g. such as on a computer hard drive on a server or other computer), which may be unsecured or which may have only limited security. In such an example, the DV 104 provides secure delivery of the document contents to distributed workflow participants who may be using unsecured storage and delivery systems.

A user (workflow participant) may have requested access to the document (e.g. MC 102) and an electronic workflow system may have generated DV 104. In one case, the user may have received his or her own copy of DV 104. For example, a user may receive DV 104 on a disk, or through email. A user may have downloaded DV 104 from a web site or Cloud onto storage 110, which may be the hard drive on his or her personal computer. In another example, the electronic workflow system may have made DV 104 available on a network server through a file system with limited security protection. Another possibility of receiving a DV may be where a user (e.g. User N) is a workflow participant and he or she receives DV 104 from a previous workflow participant (e.g. User N−1). User N may be expected to contribute to the document according to his or her role in the document workflow and the corresponding access granted. User N may then send the document to another workflow participant (e.g. User N+1) by an available (non-secure) communication channel.

DV 104 may ensure that only authorized users (e.g. authorized workflow participants) may access the document content according to their granted access rights. Where the document is a composite document that includes a number of different content parts (e.g. components, sub-components, tessellations, etc.), DV 104 may ensure that a user may access only those parts within DV 104 that correspond to the users granted access rights.

As the users (workflow participants) may not be in the same organization, there may be no shared security space where an entity such as a trusted security manager could provide/control access for every workflow participant. Accordingly, DV 104 may be generated with embedded access control so each user can only access his or her parts (the DV 104, itself, providing a mechanism to control user access).

A user (workflow participant) may employ a local agent (e.g. a software application) to access DV 104. A document interface (e.g. working as part of or in conjunction with the application program) may generate IM 106. A user may not be able to directly access DV 104, but the document interface may enable the user to access IM 106 (e.g. through management and application of the user's private decryption keys). IM 106 may provide unencrypted versions (clear-text copies) of content from DV 104 that the user may be permitted to access.

IM 106 may be created and exist only on transient storage 112, which may be processor memory such as a processor's random-access memory (RAM). Other types of transient memory such as, for example, caches (e.g. client-transparent data caches) and hardware buffers may serve as transient storage 112. IM 106 may exist only while a user is operating the application (e.g. to edit or alter the document).

The application program (e.g. using the document interface) may have exclusive access to transient storage 112 as it runs. When the application is terminated, either by a user-initiated exit or by an accidental or malicious quit), IM 106 may be erased from transient storage 112 and IM 106 may be lost, where no copy is available. To minimize potential data losses in any such event, a running application may (e.g. as a usability feature) periodically and automatically store an encrypted backup of latest typed-in information or update the DV (using a DV update procedure such as described herein). As each application owns its allocated memory an attempt by an application to access another application's memory causes, for example, a "memory violation", prevented by an OS. With an IM, a user may run his or her own application to access a DV and no other user on the same system can access the IM version.

A user (workflow participant) may provide input to the document (e.g. adding, deleting or editing content) through IM 106. When a user makes changes to the document, the user makes changes to IM 106. Upon a user's completion of an editing session, (or, for example, upon a user's input of a "save" command), the application may, e.g. using the document interface, "check in" or move the changes and editing back into DV 104, creating an updated version of DV 104 (which remains encrypted). At the end of a user's session, the application may close and IM 106 may be erased (e.g. by the document interface) from transient storage 112.

Figure 2:
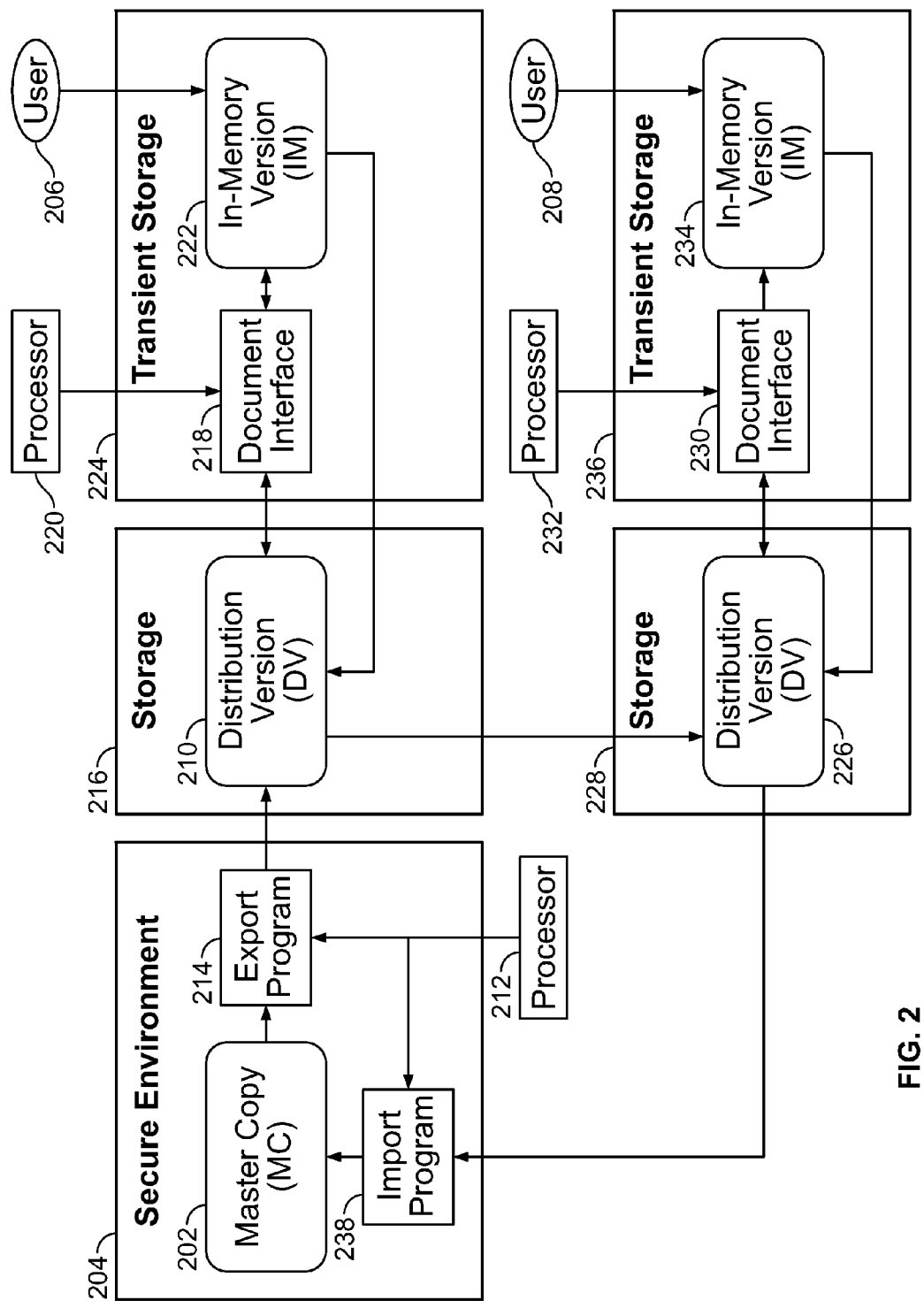
FIG. 2 is an illustration showing a document lifecycle within a document security system, according to an embodiment of the present invention.

If other users (workflow participants) may wish to edit the document, they may also be given access to (or a copy of) DV 104. Reference is now made to FIG. 2, which is an illustration showing a document lifecycle within a document security system, according to an embodiment of the present invention.

MC (master copy) 202 may be a document, such as a composite document, maintained in secure environment 204. Users 206 and 208 may be participants in a workflow. Users 206 and 208 may have no or only limited access to MC 202. Instead of allowing users 206, 208 to access MC 202, an embodiment may provide distribution version (DV) 210. DV 210 may originate from MC 202. When one or more of users 206, 208 may wish to access a document (e.g. MC 202), for example to execute tasks in a workflow, DV 210 may be generated from MC 202.

DV 210 may be a version of MC 202 designed to be distributed over traditional low-security communication channels. DV 210 may be crafted to embed an access control structure into its format. For example, DV 210 may be a .pex format document, in which all content parts are individually encrypted and signed. DV 210 may propagate to different users (e.g. to users along a path of a workflow) to accumulate the editing and updating that the users input. For example, user 206, in attempting to access the document (e.g. MC 202) may be provided with DV 210, generated, for example, by processor 212, running export program 214.

DV 210 may be loaded on storage 216 (e.g. such as on a computer hard drive on a server or other computer), which may be unsecured or which may have only limited security. For example, export program 214 may have generated DV 210 and made it available on a network server through a file system with limited security protection. In another example, user 206 may receive a copy of DV 210 (e.g. on a disk, or through email). User 206 may have downloaded DV 210 onto storage 216, which may be the hard drive on his or her personal computer.

DV 210 may ensure that only authorized users (e.g. authorized workflow participants) may access the document according to their granted access rights. Where the document is a composite document that includes different content parts (e.g. components, sub-components, tessellations, etc.), DV 210 may ensure that user 206 may access only those components within DV 210 that correspond to his or her granted access rights.

User 206 may attempt to access DV 210 through an application program which may operate using document interface 218 (e.g. operated by processor 220). Document interface 218 may generate IM 222. IM 222 may include unencrypted versions (clear-text copies) of content from DV 210 that user 206 may be permitted to access.

IM 222 may be created and exist only in transient storage 224 (the running copy of the application program and document interface 218 may also exist only in transient storage 224.) Transient storage 224 may be processor memory like the random-access memory (RAM) of the computer of user 206, and/or caches, buffers, etc. as described above. In one alternative example, low security/non-sensitive content parts of an IM may be stored on a hard drive, while high security/sensitive content parts of the IM may be stored in transient storage 224.

Document interface 218 (and/or its corresponding application program) may have exclusive access to the transient storage 224 (e.g. computer RAM) as the program runs. When document interface 218 (or the corresponding application program) is terminated either by a user "exit" or by an accidental or malicious termination, IM 222 may be erased.

User 206 may provide input to the document (e.g. adding, deleting or editing content) through IM 222. Upon user 206's completion of an editing session, (or upon user 206's entry of a "save" command), document interface 218 may "check in" or move the changes and editing back into the DV 210, creating an updated version of DV 210. At the end of user 206's session, document interface 218 may erase IM 222 from transient storage 224 (e.g. IM 222 may be erased or otherwise deleted from the RAM of user 206's computer).

In the example of FIG. 2, User 208 may also wish to edit the document. User 208 may receive access to distribution version (DV) 226. For example DV 226 may be a copy of DV 210 updated with the changes made by user 206. User 208 may have received DV 226 from User 206 via email for example.

DV 226 may be loaded on storage 228 (e.g. such as on a computer hard drive on a server or other computer), which may be unsecured. User 208 may have downloaded DV 226 onto storage 228 (e.g. from an email from User 206).

In an embodiment, DV 210 and 226, may also be the same copy. For example, if DV 210 is maintained on a server, then user 206 may access DV 210 on a server, make changes and add them to DV 210, when user 208 accessed the document in such an example, user 208 would go to the same server, and DV 226 would be the same updated version of DV 210.

DV 226 may ensure that only authorized users (e.g. authorized workflow participants) may access the document according to their granted access rights. DV 226, may, for example be a *.pex format file in which all content parts are individually encrypted and signed. User 208 may access the content parts, for example, only if user 208 can provide proper user identification. Where the document is a composite document that includes a number of different content parts (e.g. components, sub-components, tessellations, etc.), DV 226 may ensure that user 208 may access only those content parts within DV 226 that correspond to user 208's granted access rights.

User 208 may attempt to access DV 226 through an application program having document interface 230 (e.g. operated by processor 232). Document interface 230 may generate IM 234. IM 234 may include unencrypted versions (clear-text copies) of content from DV 226 that user 208 may be permitted to access.

IM 234 may be created and exist only in transient storage. Transient storage 236 may be, for example, the RAM of the computer of user 208. IM 234 may exist only while user 208 operates the application program (e.g. to review, edit or alter the document).

Document interface 230 (and/or its corresponding application program) may have exclusive access to transient storage 236 (e.g. computer RAM) as the program runs. When application program 230 is terminated (either by a user "exit" or by an accidental or malicious termination), IM 234 may be erased and IM 234 will be lost, where no copy will be available.

User 208 may provide input to the document (e.g. adding, deleting or editing content) through IM 234. Upon the user's completion of an editing session, (or upon a user 208's entry of a "save" command), document interface 230 (e.g. of the application program) may "check in" or move the changes and editing back into the DV 226, creating an updated version of DV 226. At the end of a user 208's editing session, the application may close and IM 234 may be erased or otherwise deleted from transient storage 236.

With editing completed, DV 226 may be "checked-in" (or imported) to secure environment 204 by import program 238 (e.g. operated by processor 212). MC 202 may then be updated with the changes that have been made to DV 226 (which also contains changes made, for example in the sequence of the document's travel from user 206 to user 208 (and to other users). Through this process MC 202 may updated while being maintained in a secure environment.

Composite File Structure

Figure 3:
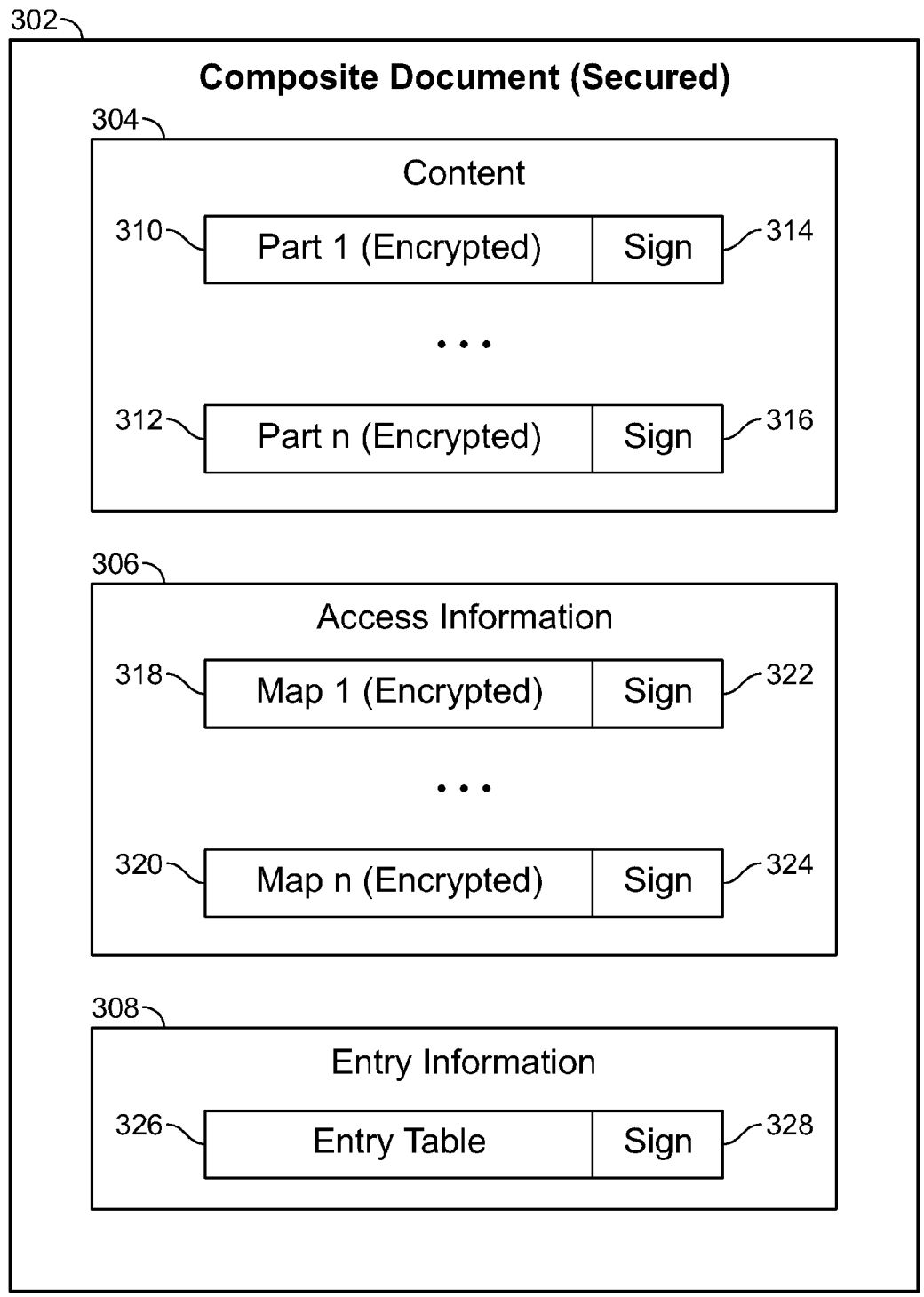
FIG. 3 is an illustration of a structure for a composite document, according to an embodiment of the invention.

Reference is now made to FIG. 3, which illustrates a structure for a composite document, according to an embodiment of the invention.

FIG. 3 depicts composite document 302, which may include content parts 304, access information (e.g. map files) 306 and entry information 308. Each of the content parts 304, access information 306 and entry information 308 may include one or more separate files, which may be organized together into a document serialization (e.g. such as in a database implementation, for example, an SQLite™ file or in a file following the *.pex file format). FIG. 3 shows content parts 304, access information 306 and entry information 308 all in encrypted forms, and as such, composite document 302 may be a secured, distribution version (DV) of a composite document.

Content parts 304 may include items (components, sub-components, tessellations, etc.) that make up the content of composite document 302. As stated, a component may be any a digital object, such as, for example, a text file, file or document created with a word processing program, file or document created with a presentation program, spreadsheet file or document, image document, audio file, resource file, style file or any other digital object.

A component may have subcomponents (e.g. a column within a spreadsheet file) and composite document 302 may manage the subcomponents separately from any parent-component. Further, groups of components and sub-components may be organized together into tessellations (e.g. to save on the number of individual parts of a composite document). Tessellations may include multiple individual component files and/or sub-components (file fragments) that may share, for example, the same access control across a workflow (A composite document (such as 302) may also be included as a content part (and be separately encrypted) inside of another composite document).

Content parts 304 may include content parts 1 . . . n. FIG. 3, shows content parts: Part 1 (310) and Part n (312). Part 1 (310) may be a text document (such as a Word™ (*.doc) file). Part n (312) may be a spreadsheet document (such as an Excel™ (*.xls) file). Other combinations of components, sub-components and/or tessellations are also possible. For example, it is also possible that each of the parts 1 . . . n (e.g.

310, 312) may be tessellations, where each tessellation includes multiple component files (and/or sub-component) files.

Users may have different access rights to each of the content parts. For example, for each part, a user may have certain access privileges such as:
- RW (read/write access): e.g. the user can open (review) the content part and make modifications;
- RO (read only access): e.g. the user can only open and review the content part, but not make changes; or
- NA (no access): e.g. the user cannot open the content part at all, user can (and in an embodiment, e.g. must) review the authenticity of any such part.

In order to control a user's access to a content part (e.g. 310, 312), the content part may first be encrypted by its own assigned encryption key (E). Users (e.g. workflow participants) who may receive a decryption key (D), corresponding to encryption key E, may then access the content part (decrypt it and read it).

In addition other keys may be employed. For example, users (e.g. workflow participants) who have been given no access privileges to any part of composite document 302 may still need to verify the authenticity of the document (or the content parts).

For example, a user receiving a DV (such as the secured composite document 302) may need (e.g. as part of a workflow) to verify authenticity of a content part (even if they have no access) immediately upon reception. Such verification of authenticity may be needed, because content parts (e.g. 310, 312) could have been modified without authorization by either the previous user (previous workflow participant) or by another person while the document was in transition.

One mechanism, in addition to assigning an encryption key (E) and a decryption key (D) for each part, may be to assign further a digital signature key (S) and a digital verification key (V) for each part. A digital signature, properly verified, may provide a user receiving a content part (e.g. 310, 312) reason to believe that the content part is authentic: for example verifying that the content part was modified by a previous workflow participant who had the right to modify the content part and the content part was not either altered in transit or altered by a previous workflow participant who was not given a right to change the content part (with identities of the workflow participants also being protected for privacy, e.g. as described further below).

Where a content part or other element is "signed" using a digital signature key (e.g. key S), a user may verify the authenticity of the signed part using a verification key (e.g. key V). Such a content part is first encrypted and then signed, thus verification may be (and in an embodiment, e.g. must be) performed whether the user has read/write (RW), read only (RO) or no access (NA). Access control for a content part may be enabled, in an embodiment of the invention with a control scheme using for example the four keys: Encryption (E), Decryption (D), Signature (S) and verification (V).

A part may be encrypted by a symmetric key (which is both encryption and decryption key) and then signed. A user with NA (no access) to a particular content part may be provided only given signature verification key for that content part, so he or she can verify authenticity. A user is given RO (read only access) for that particular content part may be provided with a decryption key (which may also serve as the encryption key) and signature verification. Such as user (with RO access) may verify the content part's authenticity using signature verification key, then decrypt part and read its contents. However, the RO user cannot update (modify, edit) the content part as he/she does not have signature key. A user with RW (read-write access) may be provided with an encryption key (usable also for decryption) and pair of signature verification keys. The RW user may verify authenticity, decrypt, edit, encrypt and then sign the updated version. As stated above, systems and methods for providing differential access to a digital document and systems and methods for application of differential policies to a digital document may be described in pending International Application Serial No. PCT/US2010/049638, titled "PROVIDING DIFFERENTIAL ACCESS TO A DIGITAL DOCUMENT", filed Sep. 21, 2010 and pending International Application Serial No. PCT/US2010/49669, titled "APPLICATION OF DIFFERENTIAL POLICIES TO AT LEAST ONE DIGITAL DOCUMENT", filed Sep. 21, 2010 which are each hereby incorporated by reference in their entirety. Further, managed access to a secure digital document (e.g. using differential access) may be described in pending U.S. patent application Ser. No. 12/949,510, "MANAGING ACCESS TO A SECURE DIGITAL DOCUMENT", filed Nov. 18, 2010 also hereby incorporated by reference in its entirety (also referenced above).

Content parts of a composite document may be separately encrypted in a distribution version (DV). Each content part may be also signed by its own digital signature key. For example Part 1 (310) may be encrypted with its own encryption key $E_1$ and signed (e.g. at 314) with its own digital signature key $S_1$. Likewise, Part n (312) may be encrypted with its own encryption key $E_n$ and signed (e.g. at 316) with its own digital signature key $S_n$.

Access information 306 may contain user access information for the document's component parts. One or more key-map files may be generated for each user who may be permitted to access the composite document (e.g. each participant in a workflow). A key-map file may provide differential access for the different users to content parts 304.

Access information 306 may include key-map files 1 . . . n. (e.g. corresponding to users 1 . . . n). FIG. 3 shows key-map files, Map 1 (318) and Map n (320). Each key-map file may include, for example, one entry per content part. Each entry may contain, for example, a content part name (name/id, identifier) and a number of keys corresponding to access rights granted to the user (e.g. workflow participant) for the particular part. In an example that includes RW, RO and NA access, there may be, for example, the following types of entries for the access keys:
- For RW (read/write access): an entry may contain the content part name ($part_i$) and keys: $E_i$, $D_i$, $S_i$, $V_i$;
- For RO (read only access): and entry may contain the content part name ($part_i$) and keys: $D_i$, $V_i$; and
- For NA (no access): an entry may contain the content part name ($part_i$) and key $V_i$ (e.g. where the content part name may be a label assigned in the serialization and not the real file name).

Map table entries may have coding as in XML format and other coding formats may be used: comma-separated values (CSV), SQL, etc. The key-map file for each user may be encrypted using the known user public encryption key, or using hybrid encryption: data may be encrypted by a specially generated symmetric encryption key, which is then encrypted using the user's public encryption key. Each encrypted key-map file may be then placed into a document serialization (e.g. and saved as an SQLite™ file or *.pex file) as a separate entry.

In FIG. 3, key-map files, Map 1 (318) and Map j, (320) are shown to be encrypted, e.g. using a known public encryption key. In addition, Map 1 (318) and Map n (320) are shown to have also been signed, e.g. at 322, 324, respectively, using digital signature keys. Key-map entries may be signed using a document master signature key, for example. Other signature key arrangements are also possible.

In addition to the above, composite document 302 may further include entry information 308. Entry information 308 may provide a way for each user to obtain access to his or her key-map file(s) within the composite document 302, while still maintaining privacy for the users.

Within composite document 302, each user (e.g. each workflow participant) may be able to identify his map-entry in order to access the component document part. Decrypting each key-map file until the correct key-map file is found may be computationally expensive. Having a user's username or other identifying information associated with the key-map file for a user may compromise security and potentially expose the identities of workflow participants.

A fast filtration entry may be provided in an embodiment by encrypting, for example, a small known string of characters, a "magic" string, for each user. Each user may attempt to decrypt these strings in turn until a correctly decrypted one is found. An entry table may be subdivided into separate cells that may include, for example: 1) The "magic word" in clear text form; 2) The same "magic word" encrypted and 3) User entry information containing corresponding map file name/id, it decryption key, signature verification (optional) keys.

To identify the user's entry, it may be sufficient to decrypt only the encrypted "magic word" and compare it with the corresponding "magic word" value from the clear text cell. FIG. 3 depicts table entry 326, which, before encryption, may look like the above. Digital signature 328 has been made for table entry 326, to verify the table entry's authenticity. In addition, techniques for providing managed access to a secured digital document, such through the use of user key entries may be described, for example, in pending U.S. patent application Ser. No. 12/949,510, "MANAGING ACCESS TO A SECURE DIGITAL DOCUMENT", filed Nov. 18, 2010, which is hereby incorporated by reference in its entirety (and also referenced above). Systems and methods for providing differential access to a digital document and systems and methods for application of differential policies to a digital document may be described, where for example access to a document part is provided through the use of user key entries, may also be described in pending International Application Serial No. PCT/US2010/049638, titled "PROVIDING DIFFERENTIAL ACCESS TO A DIGITAL DOCUMENT", filed Sep. 21, 2010 and pending International Application Serial No. PCT/US2010/49669, titled "APPLICATION OF DIFFERENTIAL POLICIES TO AT LEAST ONE DIGITAL DOCUMENT", filed Sep. 21, 2010 which are each hereby incorporated by reference in their entirety (also referenced above).

Figure 4:
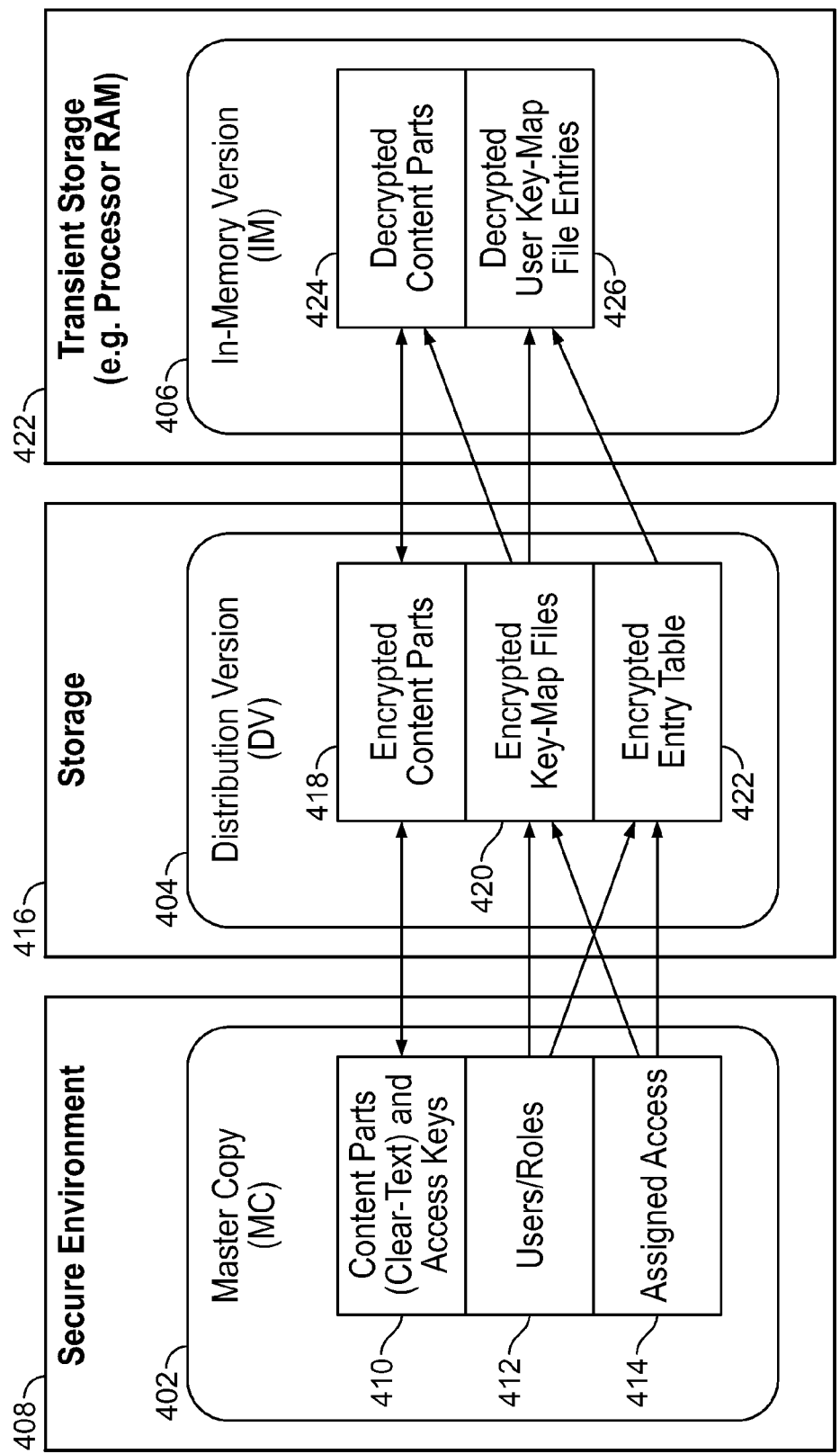
FIG. 4, is an illustration of composite document forms, according to an embodiment of the invention.

Reference is now made to FIG. 4, which illustrates elements of master copy (MC) 402, distribution version (DV) 404 and in-memory version (IM) version 406 of a composite document, according to an embodiment of the invention.

MC 402 may be a master copy of a composite document. MC 402 may include one or more content parts 410 (and access keys to the content parts), a user/role index 412 and an assigned access index 414. An MC can be a document from any authoring environment. A program such as a document master can bundle one or more separate documents (e.g. a text document (a Word™ *.doc) and a spreadsheet document (a Excel™ *.xls)), into a single composite document (master). Documents may be provided, for example, from a document repository with enforced access control. In such an example, a subset of documents from a repository (and their parts) may be combined into an MC. In an embodiment, software such as HP Exstream™ from Hewlett-Packard Company of Palo Alto, Calif. may, for example, be used to prepare a composite document master.

Users (e.g. participants in a workflow) may have limited (extremely controlled) or no access to MC 402. Accordingly, elements of MC 402 may have no encryption and, for example, each of the parts 410, user/role index 412 and assigned access index 414 may be stored with no encryption in secure environment 408. Control to MC can be protected/enforced by any standard access control mechanism.

Content parts 410 may include unencrypted, "clear-text" versions of all of the document's content parts (e.g. components, sub-components, tessellations, etc). In addition, content parts 410 may include all of the access keys corresponding to the composite document parts (e.g. encryption key (E), decryption key (D), signature key (S) and verification key (V)). For example, the MC may be physically or virtually created on the fly. The keys assigned to each user may be kept for safety (backup) within secure environment (e.g. in 410) or discarded.

User/role index 412 may list every user who may access the document (e.g. according to a workflow) and a description of their role. This could be implemented, for example, using role-based access control (RBAC), discretionary access control (DAC), mandatory access control (MAC), etc., or any form of access control that may be available in the secure environment: For example, one user may be a proofreader responsible for proofreading all text, and another user may be an economist, responsible for review all economic data (and charts) in the document. The users may be part of an electronic workflow, where the roles of each user may be monitored. Roles in a workflow, for example, may determine or affect the security access rights a particular user may have.

Assigned access index 414 may provide a listing of the security access rights each user has in each part of the composite document. Users may have different access rights to each of the content parts 410 (component, sub-component, tessellation, etc.). A user may have access privileges to each content part such as: RW, RO, NA access.

DV 404 may originate from MC 402. DV 404 may represent a secured version of MC 402. DV 404 may be loaded on to storage 416 (e.g. such as on a computer hard drive on a server or other computer), which may be unsecured or which may have only limited security. A user may have requested access to the document (e.g. MC 402) and an electronic workflow system may have generated DV 404 and made it available to the user. Then, the DV can be sent to the first user (e.g. a first workflow participant) by email, posted on CD/DVD or USB, etc. Once the first workflow participant has provided his input, he or she may send the DV to the next workflow participant, then to the next workflow participant and so on. In many cases, once the document workflow is accomplished the final DV is imported back into the original environment and may be merged with the original document, or may replace it, or both versions could be kept. The re-import to the original environment is not mandatory, but just could be a sound solution for many document workflows.

Where the document is a composite document, DV 404 may ensure that a user may access only those content parts within DV 404 that correspond to the users granted access rights. DV 404 may include encrypted content parts 418, encrypted map-files 420 and encrypted entry table 422. The configuration may follow the structure described with reference to FIG. 3.

IM 406 may be created and exist only on a transient storage 422, which may be processor memory such as processor RAM. For example, a user may access DV 404 with an application program and the application program may generate IM 406 (e.g. using a document interface, such as 218, 230, FIG. 2).

To generate IM 406, document interface (e.g. 218, 230, FIG. 2) may locate a key-map file corresponding to the user in the document serialization (DV 404). By decrypting the key-map file for the user (e.g. 420), the application (e.g. using a document interface) may then access and decrypt those parts of encrypted content parts 418 to which the user, specifically, has access. Using key entries found in the decrypted user's map-file 426 (decrypted user map-file entries), for example, the document interface may retrieve for display those decrypted content parts 424 that are available to the user (by virtue of the access that is permitted by the keys). When the application is terminated (either by a user exit or by an accidental or malicious quit), IM 406 may be erased.

Serialization

A composite document may be "serialized" to create a single document unit that may be sent (or made accessible) to users. Currently existing composite formats, such as ePub Open eBook Publication Structure (OEBPS) Container Format (OCF) 1.0 (from International Digital Publishing Forum (IDPF)), or HP Dialogue Live format (from Hewlett Packard Company of Palo Alto Calif.), may collect a set of files, comprising the corresponding document, into a single file container through a zip-archive serialization.

Such file formats may have shortcomings for a secure composite document. For example, a zip-archive imposes the mandatory top-level compression on its entries, which creates a computational overhead often without any size reduction for encrypted data. Where there are many parts to a composite document having many relationships, a relational database may provide a simple and coherent way to handle such strongly relational data.

While many relational databases (Oracle, Microsoft Access, MySQL, H2, etc.) are available and may be suitable for an embodiment of the invention, some aspects may be considered. Many databases, especially enterprise oriented databases, operate using a client-server model and may require professional installation and maintenance. It may be impractical, at times, to run such a server for each document on each customer machine. So, in such circumstances, a local access, single flat-file database may be preferable. A flat-file database may be a database (set of database tables and/or files) that is encoded as a single file.

One set of processes that may be usable in implementing an in-memory database model is the SQLite™ library by the SQLite Development Team (www.sqlite.org). SQLite serialization may facilitate clear relationships between document components without data redundancy: data items and keys may be all stored once and may be referenced only through the corresponding primary keys. Using SQLite, as just one example of a possible structure for document serialization, the disk footprint of SQLite, may be relatively small (approximately 225 kB, which may be compared to approximately 1 MB for H2). SQLite has been made available in Open Source, including a Mozilla Firefox™ plug-in.

Figure 5:
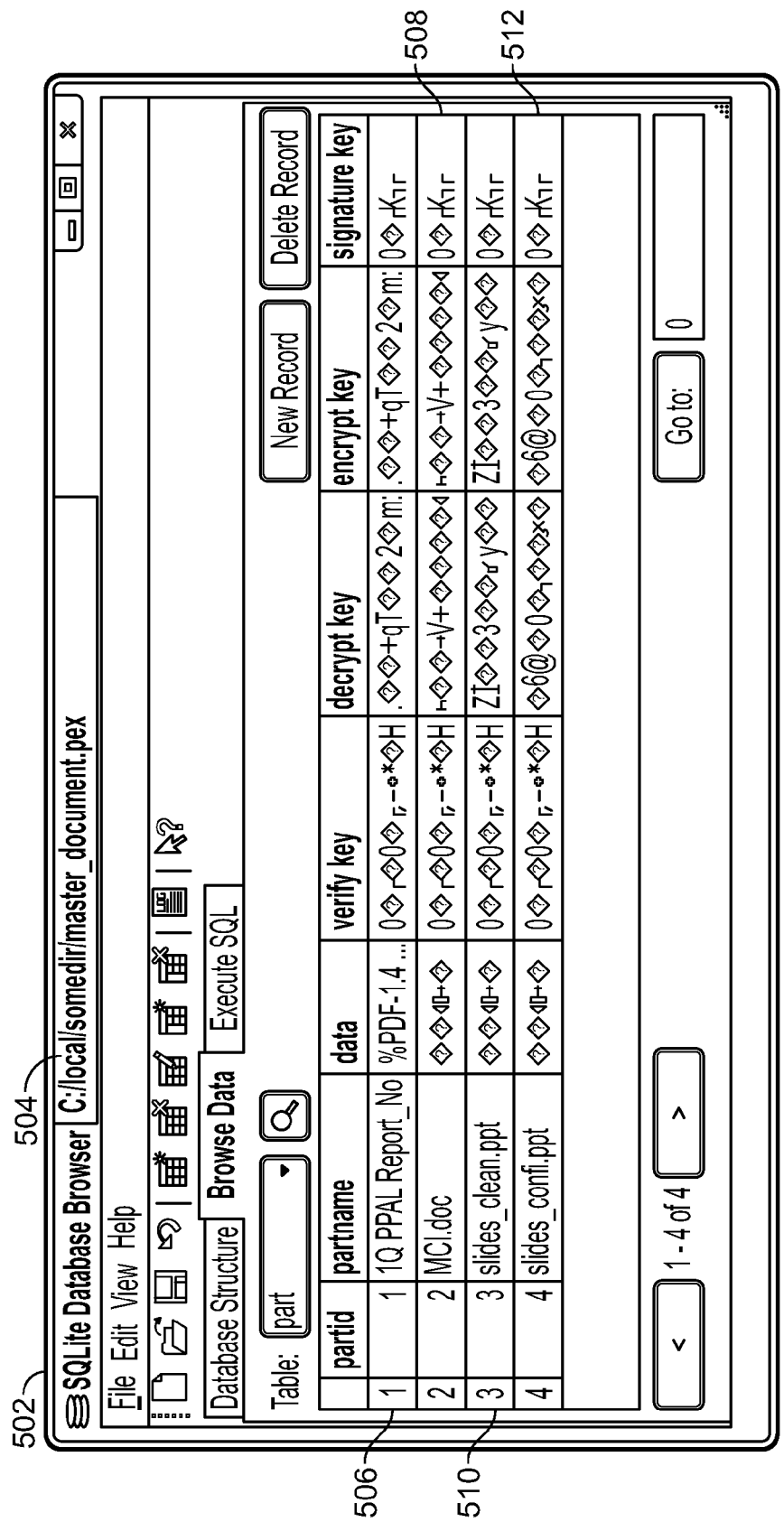
FIG. 5 is an illustration of a composite document serialization structure, according to an embodiment of the invention.

Reference is made to FIG. 5, which is an illustration of a composite document serialization structure as shown in an SQLite Manager Mozilla Firefox plug-in. FIG. 5 depicts an SQLite Manager window (window 502), which may be an access window for a composite document. The serialization file name is shown at 504. Window 502 shows that this composite document includes four content parts 506, 508, 510, 512, which in this example are individual files (components).

For example, content part 506 is a PDF file. Content part 508 may be a *.doc file (from Word™ by Microsoft). Content parts 510, 512 may be *.ppt files (from PowerPoint™ by Microsoft). Although content parts 506, 508, 510, 512 are components in this example, in other examples, content parts 506, 508, 510 and 512 may also be tessellations (groups of components and/or sub-components) or combinations of tessellations and components, for example.

For each content part 506, 508, 510, 512, keys pertaining to those component parts (e.g. a verification key (V), a decryption key (D), an encryption key (E) and a signature key (S)) are also shown (in encrypted form). For example, when a DV is created generated from a MC, each content part in the DV may be assigned its own keys, be encrypted and be signed. Corresponding subsets of keys for each user (workflow participant) who may access the document may be formed into key-map files, which may be also encrypted, signed and placed into the DV.

As revealed by file name 504, the composite document shown may be saved as a *.pex document. With a .pex format document, a .pex documents may be aggregated as needed per a workflow. A .pex document may include components, such as *.jpeg, *.pdf, *.doc, *.html, etc. files. These individual files can be considered atomic units in a document. Elements within documents, such as fields within *.pdf forms, cells or columns within *.xls spreadsheets, can also be treated as individual atomic units within a *.pex document. Thus, individual atomic units may consist of multiple files, single files, file fragments (e.g. xml-nodes), fields or elements within files, or any combination thereof. The atomic units may be aggregated into tessellations, where the tessellations comprise two or more of the atomic units using the same security key, etc.

In-Memory Data Base Processing

Figure 6:
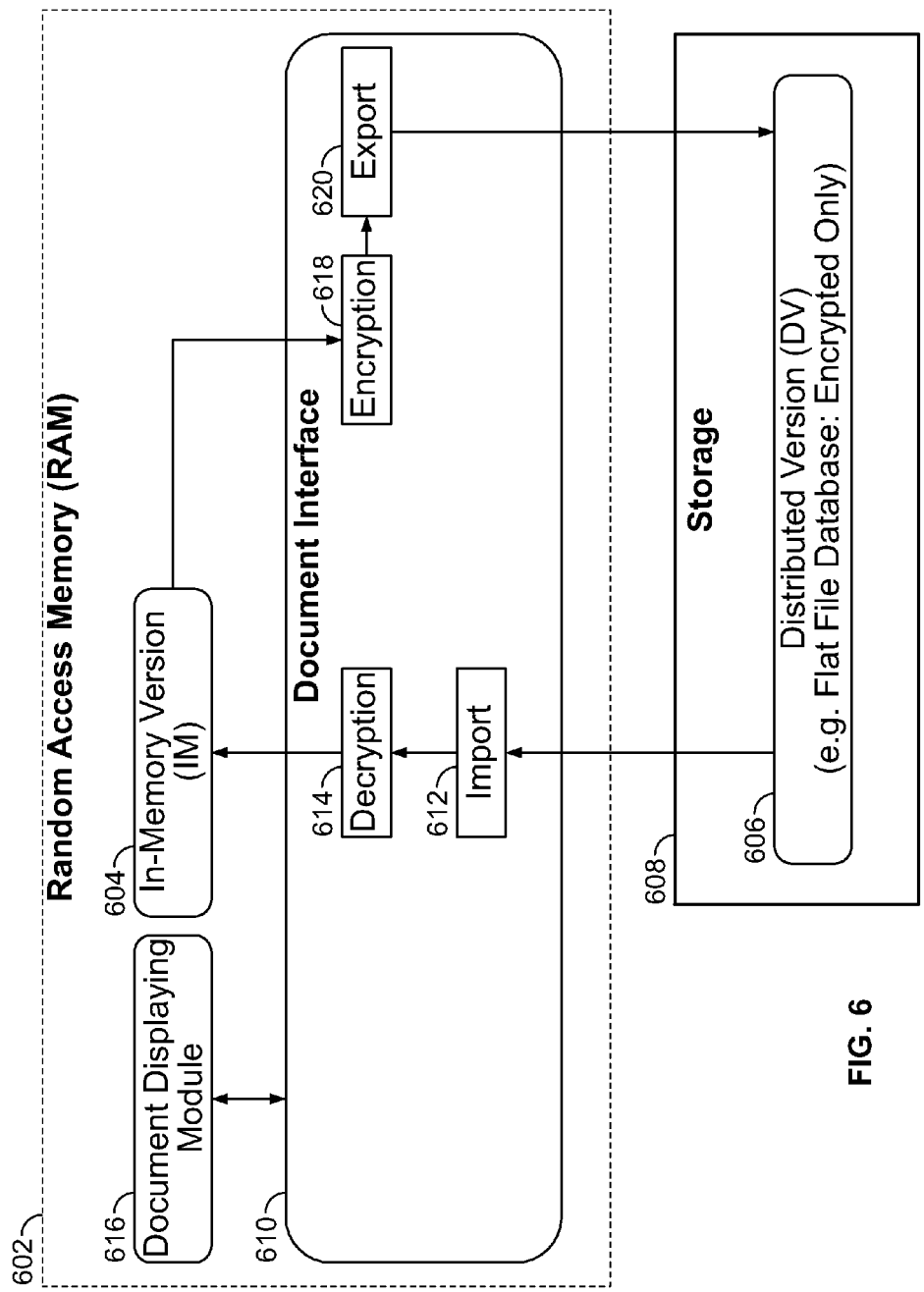
FIG. 6 is an illustration of an in-memory database processing architecture, according to an embodiment of the invention.

Reference is now made to FIG. 6, which is an illustration of an architecture for an in-memory database processing model, according to an embodiment of the invention.

FIG. 6 shows random access memory (RAM) 602, which includes in-memory version (IM) 604. IM 604 may have been generated from distribution version (DV) 606. DV 606 may be located in storage 608. DV 606 may have originated from a master copy of a document (not shown in FIG. 6), for example, for a particular workflow.

DV 606 may be a composite document implemented as flat file database. DV 606 may be a version of MC designed (e.g. having an embedded access control structure) to be distributed over traditional low-security communication channels while delivering all data to workflow participants according to the granted access. DV 606 may have a structure following the composite document structure set out in FIG. 3 and may be implemented using routines, for example in the SQLite™ library for execution by the SQLite™ database engine.

When the user attempts to access DV 606, an application program using document interface 610 may generate IM 604. IM 604 may provide unencrypted versions (clear-text copies) of content from DV 606 the user may be permitted to access.

Document interface 610 may use import routine 612 to import (read in) elements of DV 606, such as key-map file entries (See, e.g. 318, FIG. 3). Document interface 610 may use decryption routine 614 to decrypt, for example, entry table entries (e.g. in 326, FIG. 3) to locate the key-map file that corresponds to the user. The decrypted key-map file entries (e.g. subsets of keys for the user who is now accessing the DV) may be loaded into IM 604 (See 426, FIG. 4).

Based on the key map entry information, document interface 610 may further import content parts (components, sub-components, tessellations, etc.) to which the user may have access. Document interface 610 may use import routine 612 and decryption routine 614 to gather and decrypt the content parts. The content parts (in decrypted (clear-text) form may then be loaded into IM 604. Document displaying module 616 may be used by the application program to provide a graphical user interface (GUI) to the user. The user may view, review, and edit decrypted versions of the content parts to which he or she has access.

IM 604 may be created and exist on a transient, processor memory such as RAM 602. The application program, e.g. through operation of document interface 610 may have exclusive access to RAM 602 as it runs.

User may provide input to the document (e.g. adding, deleting or editing content) through IM 604. Upon the user's completion of the editing session, (or upon a "save" command input by the user) document interface 610 may "check in" or move the changes and editing back into the DV, creating an updated version of DV 606.

For example, for any composite document part (component, sub-component, tessellation, etc.) that was changed (e.g. if for example, the user had RW (read/write access), document interface 610 may use encryption routine 618 to encrypt that content part and to create a digital signature. For example, a user (workflow participant) will be provided with encryption and signature keys for each content part to which the user has RW (read/write access). When the user finishes his or her access session (or an intermediate step like saving), the edited contents may be then encrypted and signed using the provided keys. Both encrypted data and signature may then be placed into the DV.

Accessing a Distribution Version (DV)

Figure 7:
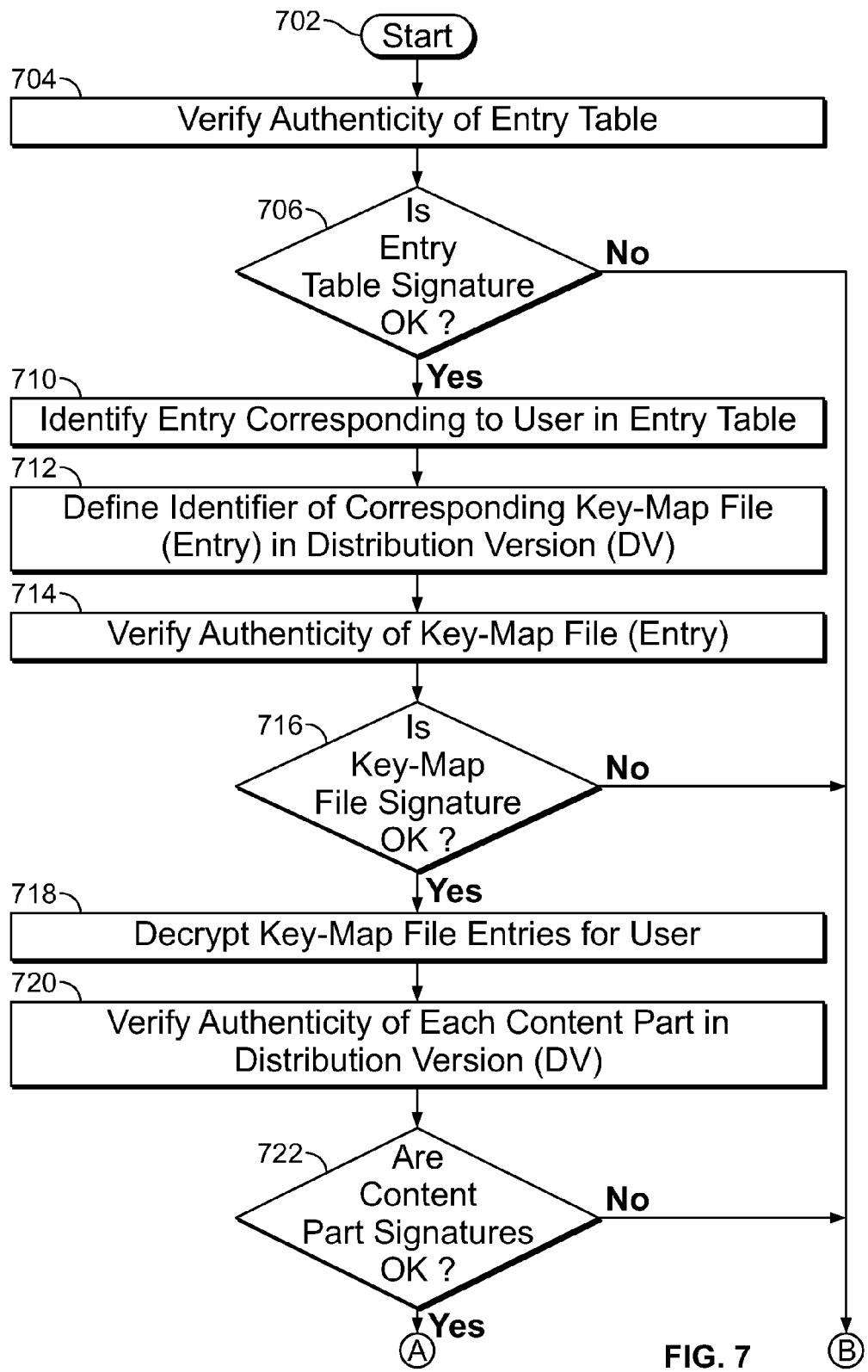
FIG. 7 is a process flow showing steps for accessing a distribution version, according to an embodiment of the invention.
Figure 7:
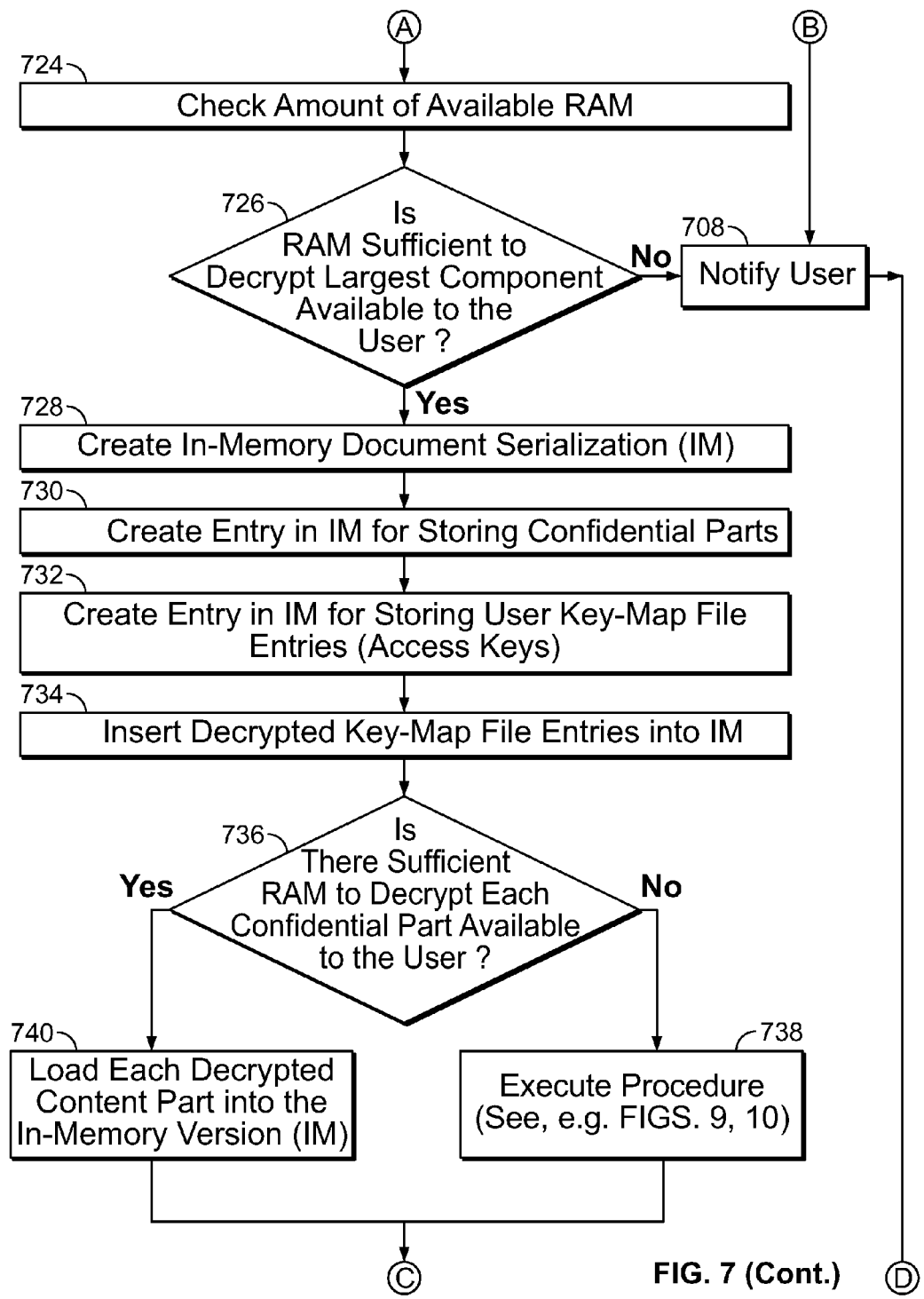
Figure 7:
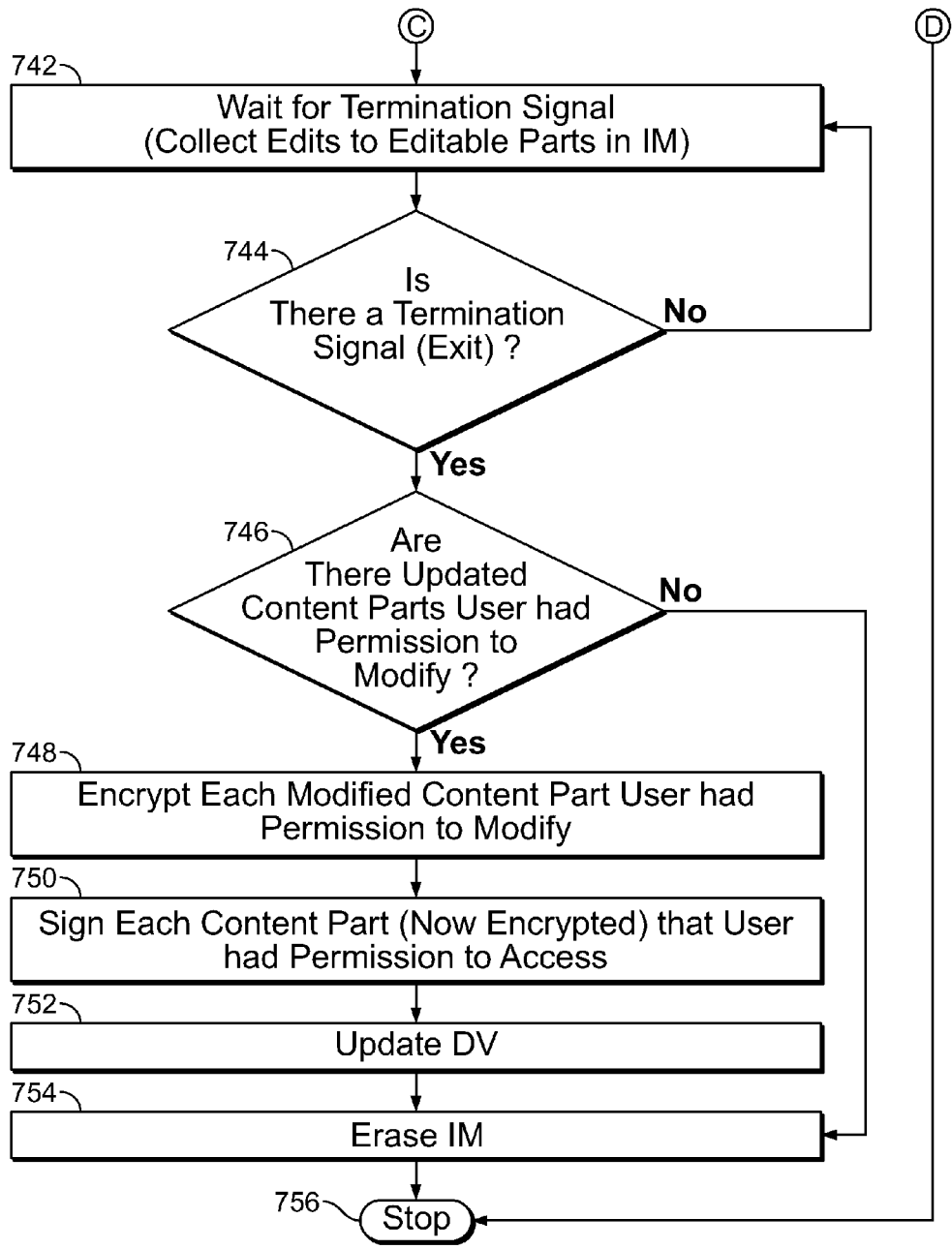

Reference is now made to FIG. 7, which is a process flow showing steps for accessing a distribution version (DV), according to an embodiment of the invention.

The process begins in step 702 and in step 704, a processor (e.g. 220, 232 (FIG. 2)) accessing a document interface may first check the authenticity of the entry table (e.g. 326, FIG. 3, 422 FIG. 4). As described with reference to FIG. 3, the entry table may provide a fast way for a user to access his or her key-map file (entry in the DV) while preserving user anonymity. If in step 706, the processor determines that the signature for the entry table is not valid, the processor may notify the user in step 708 and terminate the procedure at step 756.

If the signature for the entry table is valid, an entry corresponding to the user in the entry table may be identified in step 710 using, for example, the user's private decryption key. In step 712, an identifier (ID) of a key-map file (a key-map file entry within the DV) for the user may then be defined.

In step 714, the processor may verify the integrity of this key-map file that corresponds to the user (and found from the identifier obtained in step 712).

If in step 716, the processor determines that the signature for the key-map file (entry for the key-map file in the DV) is not valid, the processor may notify the user in step 708 and terminate the procedure at step 756.

If the signature for the key-map file is valid, the processor may then, in step 718, decrypt the key-map file (the user's key-map entries in the DV) using a key recovered from the entry table.

The key-map file may contain the verification keys for all content parts and the remainder of key-map entries (and other keys, e.g. decryption and encryption keys for the content parts that the user has RW access to and decryption keys for the content parts the user has RO access to). Using the verification keys found in the user's key-map file, the processor in step 720 may verify the authenticity of each of the content parts in the DV. In one example, each of the content parts within the DV may be verified regardless of whether the user has user has RW, RO or NA access.

In the example of step 720, the processor may perform the step of verifying the DV content parts based on information in the user's key-map file. In another example, the authenticity of all the content parts of the DV could be verified in another point in the process, such as simultaneously while verifying the authenticity of the entry table (e.g. at step 704). If in step 722, the processor determines that the signature for any one of the encrypted content parts (e.g. content parts 310, 312, FIG. 3 or 418 FIG. 4) are not valid, the processor may notify the user in step 708 and terminate the procedure at step 756.

If at step 722, the processor determines that the signatures for the content parts are valid, the processor may in step 724, check the amount of available RAM usable for reviewing the composite document parts. As stated, an embodiment of the invention may follow an in-memory database model where decrypted parts of the composite document (the DV) may exist exclusively in transient, non-permanent storage, like processor RAM. In such an embodiment, the decrypted content part may not be stored in any permanent storage. It is noted that as an alternative example, some relatively low sensitivity parts may be stored decrypted on a permanent storage (e.g. on a hard drive). For example, where the document is a form, the text of the form may be in the public domain and stored on permanent storage. However, the personal details (e.g. the data the user fills in, personal details, bank details, etc., in such an example, may be kept in the IM.

Referring again to FIG. 7, in step 726 the processor may check to determine if the available RAM is sufficient to decrypt the largest content part available for access by the particular user. One convention in implementing in-memory security may be that the largest encrypted part of the composite document, to which the user is granted access, must be able to be decrypted on the device.

With regard to steps 724 and 726 in FIG. 7, the reader may notice that for a particular DV, each of the users (workflow participants) may be given different access permissions to the different content parts in a DV. Thus, in any given access for any given user, the "largest content part" may be different for each of the different users. Users may also access the DV using different devices (e.g. different computers with different amounts of RAM). In one example, a user may be able to access content from a DV on a relatively small device (e.g. a device having a relatively small amount of transient memory) assuming the device has enough transient memory to access to the largest content part that user is permitted to access according to his or her access permissions.

If it is not possible to access in-memory the largest content the user is permitted to access, e.g. if the largest content part available to the user is too large for the available transient memory, then the document "owner" (e.g. the system administrator or workflow administrator) may be required to regenerate the DV (e.g. re-export the composite document from the master copy (MC)).

In the re-export, for example, all the large parts (large components, sub-components, tessellations, etc.) may be broken into smaller fragments (even if those components may have the same security access policies). Such a re-sizing of the parts of a composite document may be termed "re-tessellation," for example to enable in-memory security. A re-tessellation may provide that the discrete content parts may be re-made in sizes that are smaller than the available processor memory (e.g. the available RAM), even if parts of a tessellation, for example, must be broken into separate "chunks" having the same access rights.

In step 726, one possible way to detect if there is sufficient RAM may be for the processor to first attempt to decrypt the largest part available to the user within the DV (e.g. the largest content part in 304 FIG. 3)), and then check to see if the operation failed due to insufficient RAM.

In step 726, if the RAM is insufficient, processing may stop. The processor in step 708 may notify the user that available RAM is insufficient for the largest user-viewable part. The notification may, for example, also report the problem to a system or workflow administrator. The notification in step 708 may suggest, for example, that the user should access an alternative device or contact the "owner" of the DV to re-export the DV with the large parts partitioned accordingly for the user's device. After such a notification, the process may proceed to step 756 and stop.

If sufficient RAM was found in step 726, the processor may proceed to step 728 and, for example, create an in-memory document serialization (e.g. generate an IM). To create the in-memory document serialization, the processor may, for example in an embodiment using SQLite, access routines from the SQLite library to create tables for storing content parts and access keys.

In step 730, the processor may create an entry in the newly created IM for storing the confidential content parts when they are decrypted. To do this the processor may use standard Structured Query Language (SQL) commands such as, for example, "CREATE" to create a new database (e.g. the IM) and any new table (for content and key-map entry data) as needed. In step 732, the processor may create an entry in the IM for storing the user's key-map file entries (in decrypted form).

In step 734, the processor may insert the decrypted key-map file entries for the user into the entry created in step 732. For decryption (e.g. in step 718), the processor may have employed any decryption technique that reverses the encryption applied when the DV was created from the MC. Examples may include symmetric encryptions, such as the Advanced Encryption Standard (AES) or other encryption/decryption standards. For adding the map table entries to the IM, the processor may standard SQL commands such as "INSERT" when new content is inserted into a table, "SELECT" to read content in a table or any row or its part, or "UPDATE" to update an existing row or its part. It may be assumed that there is sufficient RAM available to load the key-map file entries.

In step 736, however, the processor may check to determine if there is sufficient RAM for all of the content parts to which the user may receive access. As composite document parts (e.g. components, sub-components, tessellations, etc.) may be voluminous in quantity and large in size, the processor may check to determine if there is enough RAM to load all of the content parts, so the user may have all of the confidential parts of the DV in-memory and available for access in the IM.

For relatively small documents or if for example, the user is accessing the DV using a powerful device with a large amount of available RAM, it may be possible to keep all of the content parts decrypted, in memory, for a particular user access.

However, in general, to present a composite document to a user (e.g. through an application program GUI), a large number of content parts may need to be simultaneously decrypted and made available. Each part may also consist of a number of individually addressable document content parts—files (components) or their fragments (sub-components)—that were combined together through, for example, a document tessellation.

In executing step 736, the processor may check for sufficient available RAM for full content part loading, for example, by attempting to decrypt in the available transient memory all of the content parts the user has been given permission to access or by comparing available RAM that may be required for the document decryption without actually performing the operation If the RAM is insufficient (e.g. the processor runs out of memory before decryption of all available parts is completed), the processor may proceed to step 738 and begin a process where the processor will not load all of the DV content parts, but will instead wait for a user to generate requests (for example by navigating through on-screen document presentation) for specific parts and then load them in the IM. Such as process is further described with reference to FIGS. 8-9.

If in step 736, there is sufficient memory (and all of the content parts can be decrypted), the processor may proceed in step 740 to load into to the IM all of the confidential parts available to the user and make them available through the IM.

Following step 740, the user (e.g. accessing the IM through the GUI of the application) may have opportunity to review and edit parts of DV that have been made available to him or her. For example, if the key-map file entry data provides that the user has RW (read/write access) to a particular part, he or she will be able to edit and change that part.

In step 742, while the user navigates, reviews and (possibly) edits parts of the composite document stored in the IM, the processor may wait for a signal from the user to terminate the program.

If, in step 744, the processor does not receive a termination signal, the processor returns to step 742 (e.g. to collect user edits and to provide user reviewing facilities). In step 744, if the processor receives a termination signal (e.g. an exit or quit command from the user), the processor may execute a termination process.

In step 746, the processor may determine if there are any content parts currently stored in the IM (in decrypted form) that have been updated and which the user had permission (e.g. RW access) to modify. If, in step 746, the processor finds that no content part in the IM has been modified, the processor may proceed to step 754, to erase (or otherwise delete) the IM and then terminate in step 756.

If, in step 746, IM content parts (that the user had permission to modify) have been modified, the processor may update the DV and "check-in" the updated content parts. For example, the processor in step 748 may encrypt each modified part the user had permission to modify (e.g. using the same encryption that was used when the original DV was created from MC). The processor may then in step 750 sign each updated part to provide to the next user an assurance of authenticity.

With the parts encrypted and signed the processor may proceed to step 752, where the encrypted parts may be loaded into the DV (e.g. in such example, keys are not loaded back into DV, only parts. Keys may be discarded together with the memory). Following the update of the DV processing, the transient memory may be erased (in step 754) and the process may terminate in step 756.

It may be noted that in the event of a crash, occurring for example as a result of a software bug or accidental malicious termination of the application processes, the memory allocated for the application and the IM may be reclaimed back by OS and is not made available/accessible to any other processes. In such an example, no sensitive data leak may occur.

Moving Content Parts In-Memory

As noted above with regard steps 736 and 738 in FIG. 7, where there is insufficient RAM to load all of the confidential content parts of a DV into transient storage, the processor may execute a procedure or mechanism where the processor may first wait for a request for a certain part of the composite document and then provide that part to the IM.

Figure 8:
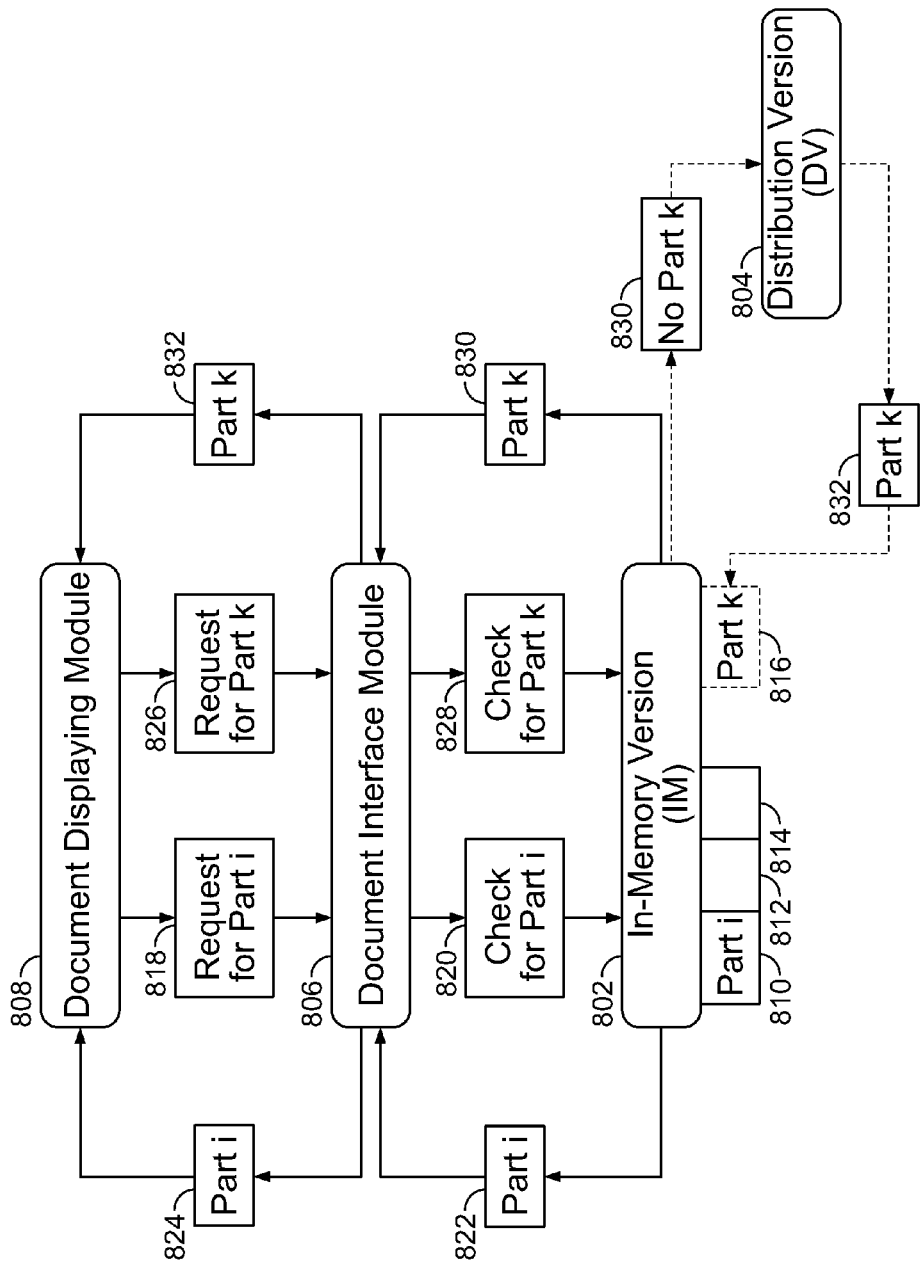
FIG. 8 is an illustration of a process and mechanism for accessing content parts, according to an embodiment of the invention.

Reference is now made to FIG. 8, which is an illustration of a process and mechanism for accessing content parts according to an embodiment of the invention.

FIG. 8 shows in-memory version (IM) 802, which may be, for example, an in-memory (e.g. RAM) version of distribution version (DV) 804. DV 804 may be a version of a composite document (which serves as a master copy (MC)). DV 904 may be designed (e.g. having an embedded access control structure) to be distributed over traditional low-security communication channels while delivering all data to workflow participants according to the granted access.

A user (such as a workflow participant) may have attempted to access DV 804 with an application program and the application program (e.g. with document interface module 806) may have generated IM 802. Document interface module 806 may manage requests for composite document parts from document displaying module 808. Document interface module 806 and document displaying module 808 may be, for example, part of or integrated with the application program.

In FIG. 8, IM 802 is shown with a number of content parts 810, 812, 814 that have been accessed from DV 804 and decrypted. Part i (810) may be one of those content parts. Parts 812, 814 have also been decrypted in this example. Park k (816) (shown with dashed line in FIG. 8 at 816) has not been initially accessed and is not yet loaded into IM 802.

In FIG. 8, document displaying module 808 may generate request 818, for example, to display Part i (810). Request 818 may be relayed to document interface 806. Document interface 806 may perform check 820 to determine if the part requested (Part i (810)) has been already decrypted and loaded into IM 802.

In this case Part i (810) is in IM 802. Document interface module 806 may return the content of Part i (810) to document displaying module 808. For example, the processor may pass the content (e.g. shown at 822) of Part i to the handling application (e.g. document interface module 806) which may, in turn, pass the content (e.g. shown at 824) onto the displaying application (document displaying module 808). Document displaying module 808 may display the decrypted version of Part i (810) to the user. The user may edit the part if he or she has RO (read/write access), for example.

Document displaying module 808 may further generate request 826 to display a Part k. As described above, Park k may not be loaded in IM 802 initially and may not be in IM 802 at the time request 826 is made. Request 826 may be relayed to document interface 806. Document interface 806 may perform check 828 to determine if the part requested (Part k) has been already decrypted and loaded into IM 802. In this case, Part k has not been loaded. It is not in IM 802 at the time check 828 is made.

In such an example, where Part k is not in IM 802, document interface module 806 may then access DV 804 to retrieve Part k (as shown at 832). The document interface module 806 may access DV 804 to locate Part k (e.g. at 832) and Part k may then be imported if there is sufficient memory.

Document interface module 806 may, for example, attempt to decrypt Part k and in doing so determine then if there is sufficient memory (e.g. sufficient RAM) available for Part K. If sufficient memory (e.g. RAM) exists (such that Part K can be decrypted), document interface module 806 may load Part k as a decrypted composite document part into IM 802 (e.g. at 816).

If there is not sufficient memory available, document interface module 806 may examine each of the parts that have already been loaded into IM 802 (e.g. the processor may examine Parts 810 (Part i), 812, 814 to determine which of those parts may serve as a candidate for deletion (off-loading) from IM 802. Document interface module 806 may identify a content part (e.g. 814) as a candidate for deletion from IM 802 based on factors such as:

Is it a part that has the longest idle time (e.g. the part that has been modified longest ago)?

Is it a part that has the longest path from the other parts currently loaded (for example, user is currently reading an "Introduction" section, so a "conclusions" section can be off-loaded for now. An application that handles document layout, referencing, etc. may have its own concept of content part relations, e.g. in the context of XPath, which may also be used to determine a "longest path" from other parts currently loaded)?

Is it the part having the lowest security risk (lowest priority)?

Is it a part that the user has RO (read only access) and not RW (read/write access)?

Many other criteria for making a part a candidate for deletion from IM 802 may be used. If a content part (e.g. part 814) has been identified, document interface module 806 may execute a process to remove the content part from IM 802. For example if the content part to be removed (e.g. 814) has been modified, document interface module 806 may update DV 804 by encrypting the content part to be removed, signing that content part and then adding that content part (in encrypted form) back into DV 804.

One or more content parts (e.g. 810, 812, 814) may have to be removed from IM 802 in order for Part k (832) to be added. When sufficient space has been created, Part k (832) may be decrypted and loaded into IM 802 (e.g. at 816).

When Part k (at 816) is in IM 802, document interface module 806 may return the content of Part k (from 816) to the requested application. For example, the processor may pass the content (e.g. shown at 830) of Part k to the handling application (e.g. document interface module 906) which may, in turn, pass the content (shown at 832) onto the displaying application (document displaying module 808). Document displaying module 808 may display the decrypted version of Part k (816) to the user.

Figure 9:
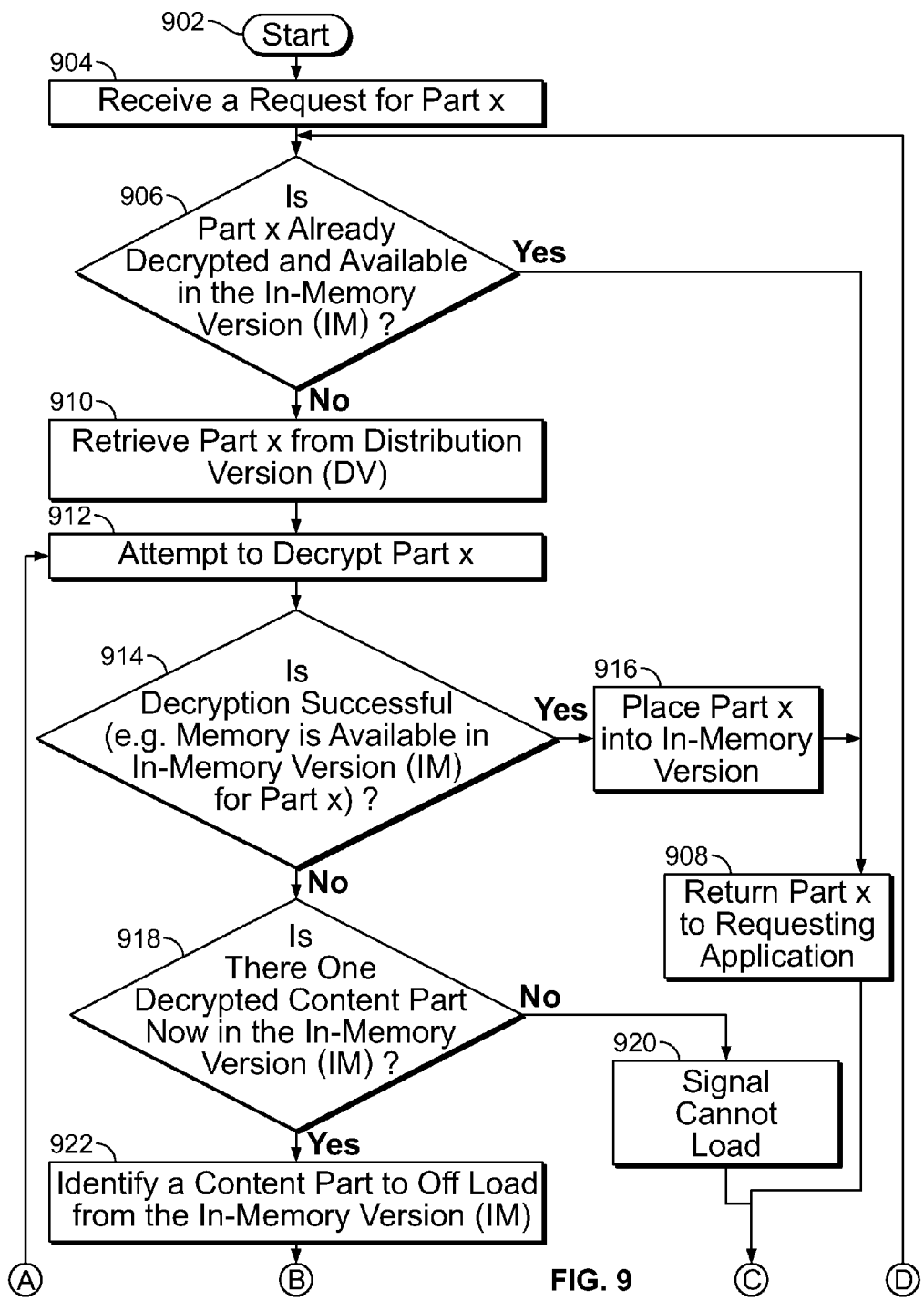
FIG. 9 is a process flow showing a process for adding a content part to an in-memory version, according to an embodiment of the invention.
Figure 9:
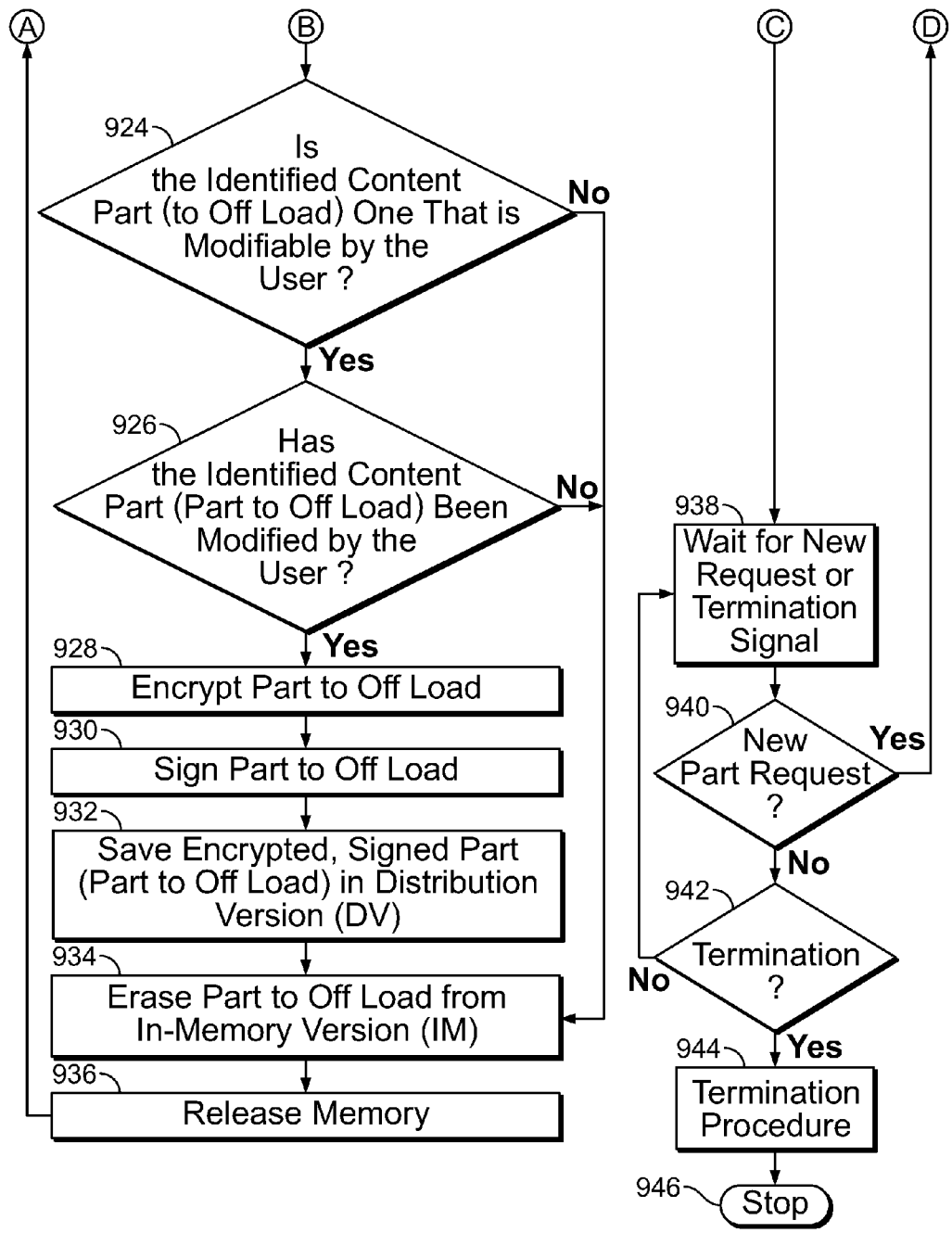

Reference is now made to FIG. 9, which is a process flow diagram showing a process for adding a content part to an in-memory version, according to an embodiment of the invention.

In step 902 the process begins where a processor, for example, executing the procedures of a document interface module (e.g. 806, FIG. 8) may be waiting for a request to display a content part (e.g. a component, sub-component, tessellation, etc.) In step 904 the processor may receive a request for a part, such as Part x. The request may have been generated from a document displaying module (e.g. 808, FIG. 8), which may be part of a larger user application program.

In step 906, the processor may check to determine if Part x is already decrypted and available in the in-memory version (IM) currently in RAM. For example, a user may have received a distribution version (DV) of a document, such as a composite document. The user, for example, operating an application may have attempted to access the DV, and the document interface (like 806, FIG. 8) may have generated an IM. The IM may contain some of the content parts (in decrypted form) from the DV the user has permission to access.

If in step 906 Part x is currently included in the IM, the processor (e.g. executing the instructions of the document interface module 806, FIG. 8) may proceed to step 908 and return the content of Part x to the requesting application (e.g. document displaying module, 808, FIG. 8). Thereafter, at step 938, the processor may wait for a request for another document part, or a signal for termination. If in step 940 a request for another document part is received, the processor will return again to step 906. If a request to terminate is received in step 942, the processor may execute a termination process in step 944 (and stop in step 946), e.g. following steps 746-756 in FIG. 7.

Returning to step 906, if Part x is not available in the in-memory version (IM), the processor in step 910 may locate (access) Part x (in encrypted form) in the distribution version (DV) and then, in step 912, attempt to decrypt Part x.

In step 914, the processor may check the attempt to decrypt Part x and determine, for example if the decryption was successful. If the decryption was successful (e.g. there is sufficient transient memory available to hold Part x, as decrypted), the processor may, in step 916, place Part x (decrypted) into the in-memory version (IM), and then, in step 908, return the content of Part x to the requesting application. Thereafter, the processor may either wait for another request for a document part or termination following, e.g. steps 938-946, described above.

In step 914, if the processor determines, there is not sufficient memory available for Part x into IM (e.g. the decryption was unsuccessful), the processor may then begin a process to remove (or off-load) content parts currently in the IM (and currently decrypted) in an attempt to make room in the transient memory (and IM) for Part x.

In step 918, the processor may check the current inventory of decrypted content parts in the IM to determine if there is at least one content part loaded in the IM, which could be removed (off-loaded) from the IM to make room for Part x.

If in step 918, there is no part to swap, then, it may not be possible to remove a part and make room in the transient memory for Part x. Accordingly, the processor in step 920 may stop the attempt to add Part x and, for example, the processor may notify the user (e.g. explaining that there is not sufficient available memory to access content parts from the DV).

If in step 918, there are one or more content parts currently in the IM, the processor may in step 922 examine the content parts currently decrypted and loaded in the IM to identify a content part that may be a candidate for removal (a content part that can be off-loaded from the IM). As stated with regard to FIG. 8, a candidate for off-loading from an IM may be identified based on factors such as: lowest security risk (lowest priority), user access (does the user have read only access (RO)?), longest idle time (e.g. the content part that has been modified longest ago), longest path from the other content parts currently loaded and other factors. Based on such criterion, the processor may identify a content part within IM as a candidate for removal.

The processor may then proceed to remove (or off load) the candidate content part from the IM. In step 924, the processor may determine whether the content part to be off-loaded is modifiable. If, for example, the user has RO (read only access) to the content part to be off-loaded, the user would have no ability to make changes to the content part and it may be easily deleted.

In such a circumstance, the processor may proceed to step 934 and erase (delete) the part to be off-loaded from the IM. In step 936 the processor may release the memory used previously for the part to off load (e.g. making it available for Part x) and then return to step 912 (and then 914) to determine if the erasure of the part now off-loaded created sufficient space in IM for Part x.

If, in step 924, it is determined that the part to be off-loaded from the IM was modifiable (e.g. the user had RW (read/write access) to this content part), the processor may in step 926 determine if the content part to be off-loaded was modified during the current IM session. If no modifications were made, the processor may proceed, again, to step 934 to erase (delete) the part to be off-loaded from the IM. In step 936 the processor may release the memory (e.g. making it available for Part x) and return to step 912 (and then 914) to determine if the erasure of the part now off-loaded created sufficient space in IM for Part x.

If, in step 926, it is determined that the part to be off-loaded has been modified in the current IM session (e.g. the user had permission to make changes), the processor may execute a process to update the DV and "check-in" the changes made. In step 928, the processor may encrypt the part to be off-loaded and in step 930 sign the corresponding keys.

With the part encrypted and signed the processor may then proceed to step 932, where the content part to be off-loaded from the IM may be loaded into the DV. Following the update of the DV, the processor may in step 934 erase (delete) the content part to be off-loaded from the IM. In step 936 the processor may then proceed to release the memory (e.g. making it available for Part x) and then return to step 912 to attempt again to decrypt Part x and determine if the erasure of the part to be off-loaded created sufficient space in IM for Part x.

If, in step 912, a decryption is again attempted and in step 914 it is determined that the decryption is not successful, again, the processor will continue removing decrypted content parts (e.g. following steps 918-936), until enough memory is released (to allow Part x to be decrypted) or until no more decrypted content parts remain in the IM (in which case, there are no more content parts to offload to make room for Part x and the procedure will terminate).

If, in step 912, decryption is attempted again and, the processor determines in step 914 that sufficient memory has been created for Part x (the decryption was successful), the processor may in step 916 add the content of Part x into the IM and then and proceed in step 908 to return the Part x content to the requesting application (e.g. document displaying module 808, FIG. 8). Thereafter, the processor may either wait for another request for a document part or termination following, e.g. steps 938-946, described above.

In-Memory Considerations

As the user navigates along a document, (e.g. using an application GUI) content parts may need to be extracted and presented, while maintaining the document structure.

This may be achieved, for example, by moving content parts from the DV to the IM, for example, as described above with reference to FIGS. 8 and 9. Additionally, it may be achieved by temporarily storing decrypted contents on some secure area of local hard-drive that should be exclusively accessed by the running application only and cleared on any application exit: normal or emergency, including application crash.

Another strategy may be to order the content parts by their relative security. In cases when more information is likely to be exposed (moved to a less secure memory), a convention may be implemented where it is always the lowest security risk information that is moved into the more exposed caching, etc., areas.

Alternatively, the tessellation size may be arranged when creating the DV so that the space needed for the decryptions will match the space available in-memory (the dynamic heap-memory allocation that can be given to user application)—that is, create content parts of tessellations that are so that $S_t < FS*S_m$, where $S_t$=tessellation size, $S_m$=memory size and FS is a scaling factor like 0.25. Such an equation for managing the size of the content parts, for example an equation such as $S_r<0.25*S_m$, may, for example allow for two interacting content parts, at minimum, to be loaded and decrypted into memory simultaneously. Other size factors, where, for example, FS<0.25, may be chosen to optimize system performance. The choice of a value for FS may depend to on hardware configuration and other considerations such as (extent and relative speed of cache, etc.).

Document Lifecycle Process Flow

Figure 10:
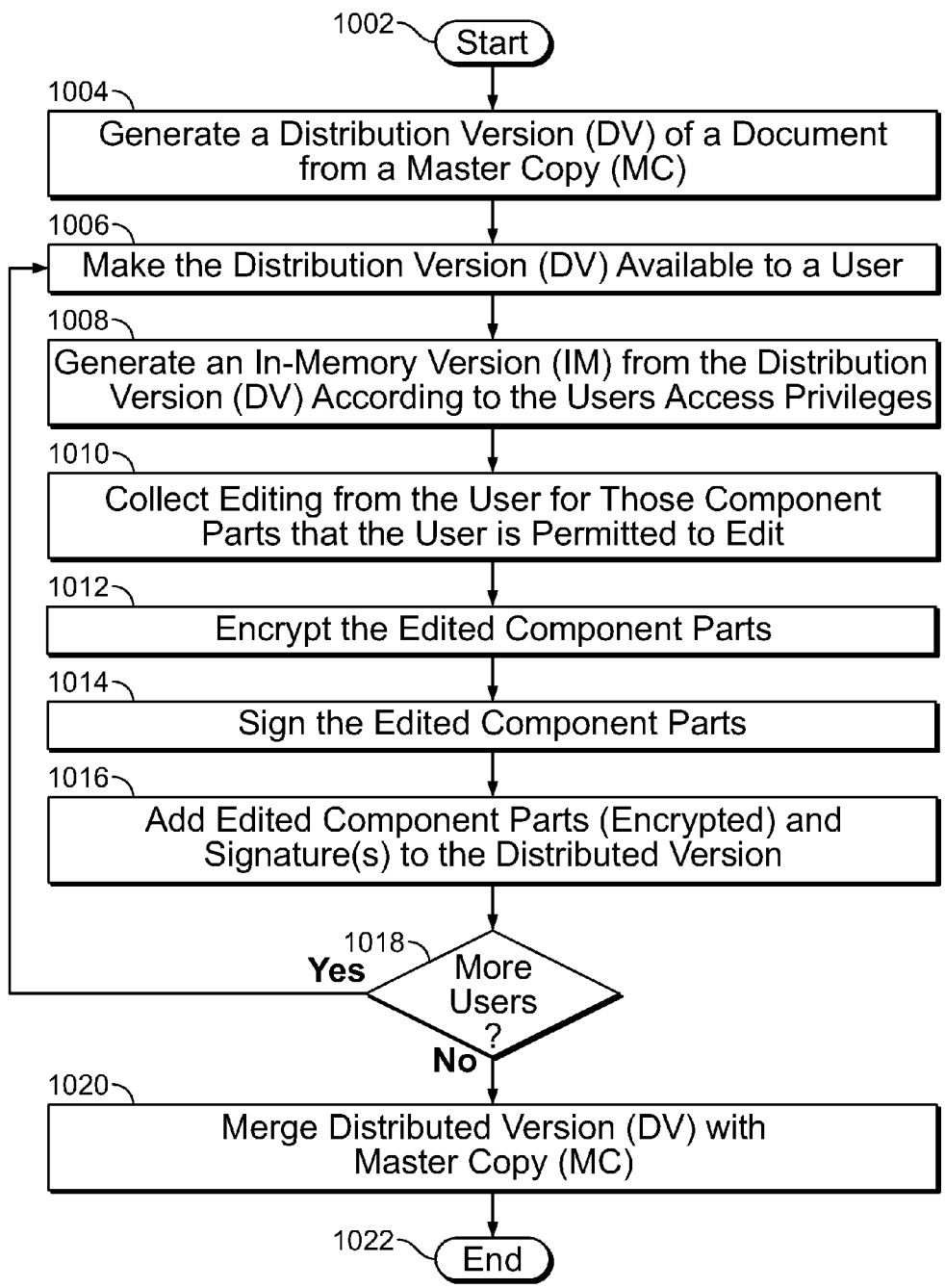
FIG. 10 is a process flow showing a process of a document life cycle where multiple users access a document, according to an embodiment of the invention.

Reference is now made to FIG. 10, which is an exemplary process flow showing a process for editing a document by multiple users, for example who may be participants in a workflow, according to an embodiment of the invention.

In step 1002 the process begins and in step 1004, a processor (e.g. such as processor 212, FIG. 2) generates a distributed version (DV) of a document from a master copy (MC). The master copy may be, for example, a composite document and the MC may be maintained in a secure computer environment, such as in a firewall protected environment. The DV may have been generated automatically by an electronic workflow system to execute a set of tasks according to a workflow, where users are workflow participants. The DV may be, for example, a *.pex document with each content part individually encrypted and signed In step 1006, the system may make a copy of the distribution version (DV) available to a user (e.g. 206, 208, FIG. 2). In such an example, the user may have received a copy of the DV through a low security communication channel, such as through email or on a disc such as a CD or DVD. Alternatively, a processor of an electronic workflow system may for example allow the user to access the DV, such as by placing it on a server. The user(s) may download the DV to a storage, such as an unsecured storage on his or her personal computer.

In step 1008, a processor (e.g. 220, 232, FIG. 2) operated by the user (e.g. while running an application program) may generate an in-memory version (IM) of the DV (e.g. 222, 234). The IM may be created and exist only on a transient storage (e.g. 224, 236), which may be a processor RAM. The IM may exist only while user is operating an application to edit or alter the document.

As each individual user may have different access rights to the content parts of the DV, the IM created (and the content parts that may be decrypted and shown) as each individual user accesses the DV will be specific to the individual user (e.g. by his or her security access rights) and also by the configuration of the computer by which the user is accessing the IM. The IM may have different content parts and keys for each user that may attempt to access the DV.

In step 1010, the user may provide input to the document (e.g. adding, deleting or editing content) through the IM, and those changes may be collected, e.g. by the processor operating the application program (such as one working in conjunction with a document interface such as 610, 806 FIGS. 6, 8). Upon a user's completion of an editing session, (or, for example, upon a user's input of a "save" command), the application may, e.g. using the document interface, "check in" or move the changes and editing back into the DV, creating an updated version of DV (which remains encrypted). The application may perform periodical auto-checking for avoid loosing data in any event. For example, to save the edits, in step 1012 the processor (operating the document interface) may encrypt the altered content parts. In step 1014, the processor may sign the encryptions. In step 1016, the processor may add the edited component parts to the DV. At the end of a user's session, the application may close and IM may be erased (e.g. by the document interface) from transient storage.

In step 1018, if the DV is to be accessed by more users, the DV (or a copy or the DV) may be sent to another user. In one example, the DV (with the edits of the first user may be sent to a subsequent user (another workflow participant) by email or by mail (with the DV on a disk) and, again, the process returns to step 1006. In another example, a processor, such as a processor operating an electronic workflow system, may determine if another user (e.g. another workflow participant) needs to access the DV. If so, the processor, may make the DV (now edited) available to another user (and the process returns, again, to step 1006) e.g. where the users are on the same system (and the process returns to step 1006). Each subsequent user (workflow participant) may follow steps 1006-1016 to access and further edit the DV as that user's permission may allow.

If, in step 1018, there are no further users who need to access the DV, a processor, such as a processor at the location of the master copy (MC) may, in step 1020, import the DV to the secure environment and then merge the changes in the DV into the MC. In step 1020, the processor may import either a single copy of the DV (containing all of the user's edits/changes) or multiple copies of the DV (which may have been provided to the users). In step 1020, the processor may, for example, verify the signatures on all of the changes and upon verification, merge the changes into the master copy (MC). Upon import, MC and DV can be both kept or merged by any predefined rules or the DV could overwrite MC. Processing may complete in step 1022.

Additional Considerations

Unless specifically stated otherwise, as apparent from the discussion above, it is appreciated that throughout the specification discussions utilizing terms such as "processing," "computing," "calculating," "determining," or the like, refer to the action and/or processes of a computer or computing system, or similar electronic computing device, for example comprising processors, that manipulate and/or transform data represented as physical, such as electronic, quantities within the computing system's registers and/or memories into other data similarly represented as physical quantities within the computing system's memories, registers or other such information storage, transmission or display devices.

An embodiment of the invention may be implemented, for example, using a non-transitory computer readable medium or article which may store an instruction or a set of instructions that, if executed by a machine having a processor, cause the processor to perform a method and/or operations in accordance with embodiments of the invention. Such a machine having a processor may include, for example, any suitable processing platform, computing platform, computing device, processing device, computing system, processing system, computer, processor, or the like, and may be implemented using any suitable combination of hardware and/or software. The non-transitory computer-readable medium or article may include, for example, any suitable type of memory unit, memory device, memory article, memory medium, storage device, storage article, storage medium and/or storage unit, e.g., memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, target code, compiled code, interpreted code, executable code, static code, dynamic code, or the like, and may be implemented using any suitable high-level, low-level, object-oriented, visual, compiled and/or interpreted programming languages like C, C++, Java, BASIC, Pascal, Fortran, COBOL, assembly language, machine code, or the like.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

We claim:

1. A method for document security, comprising:
   recognizing an attempt to access a distribution version of a composite document with embedded access control, the distribution version being implemented as a flat file database located in a permanent storage and including a set of individually accessible content parts, a digital signature key for each content part, and a key-map file, the key-map file being associated with a particular user;
   in response to recognizing the attempt, creating an in-memory version of the composite document for the particular user based upon his access rights, the in-memory version including a new database stored in a transient memory;
   decrypting the key-map file located in the distribution version of the composite document with embedded access control;
   using information in the key-map file, identifying a content part of the composite document to which the particular user has access;
   decrypting the content part, wherein the key-map file provides a key to access the content part;
   loading the content part in decrypted form into the in-memory version of the composite document, wherein the content part in decrypted form is maintained exclusively in the transient memory; and
   erasing the content part in decrypted form from the transient memory upon termination of a program to access the decrypted content part from the in-memory version of the composite document.

2. The method of claim 1, wherein the in-memory version is a document serialization having a relational database structure.

3. The method of claim 2, further comprising:
   encrypting an edited content part by an encryption key that corresponds to a decryption key from the key-map file used to decrypt the content part; and
   storing the edited content part in the distribution version of the composite document with embedded access control to create an updated distribution version of the composite document with embedded access control.

4. The method of claim 3, further comprising sending the updated distribution version of the composite document with embedded access control to a second user over a low security communication channel.

5. The method of claim 3, further comprising updating a master copy corresponding to the distribution version of the composite document with embedded access control with data from the updated distribution version of the composite document with embedded access control.

6. The method of claim 1, further comprising checking an amount of space available in the transient memory to determine if there is sufficient space to decrypt a largest encrypted content part in the composite document that the user may have access to according to one or more keys stored in the key-map file.

7. The method of claim 6, further comprising generating a notification when there is insufficient space available in the transient memory to decrypt the largest encrypted content part.

8. The method of claim 1, further comprising:
   decrypting each of one or more encrypted content parts of the composite document with embedded access control that the user has access to according to one or more keys stored in the key-map file; and
   loading each of the one or more content parts in decrypted form into the in-memory version of the composite document if it is determined there is sufficient transient memory to hold each of the one or more content parts in decrypted form.

9. A system for document security comprising:
   a permanent storage;
   a transient memory;
   a secured distribution version of a composite document comprising one or more individually accessible encrypted content parts, a digital signature key for each content part, and one or more encrypted key-map files, the key-map files comprising access information for the one or more content parts corresponding to one or more users, the distribution version being implemented as a flat file database located in the permanent storage;
   a document interface, to locate a key-map file corresponding to a particular user from the one or more encrypted key-map files, to identify a content part that the particular user may access, and to decrypt the content part according to a key in the located key-map file;
   an in-memory version of the composite document stored in the transient memory for the particular user, the in-memory version being based upon the user's access rights and being a new database, and the document interface further to store the content part in decrypted form exclusively in the in-memory version; and
   a program to enable access to the content part in decrypted form in the transient memory and to initiate erasing of the content part in decrypted form when terminated.

10. The system of claim 9, wherein the secured distribution version of the composite document was generated from a master copy maintained in a secure location.

11. The system of claim 9, further comprising an entry table within the secured distribution version of the composite document to find the location of the key-map file that corresponds to the particular user.

12. The system of claim 11, further comprising an entry in the entry table to be decrypted by the particular user to locate the location of the key-map file that corresponds to the particular user.

13. The system of claim 9, wherein the in-memory version of the composite document created in the transient memory holds decrypted entries from the located key-map file, the decrypted entries comprising access keys for the access granted the particular user for the content part.

14. The system of claim 9, wherein the secured distribution version of the composite document is distributed to a number of users performing tasks according to a workflow.

15. The system of claim 13, wherein the new database is a relational database, and wherein the decrypted entries are stored in a table in the relational database.

16. A non-transitory computer-readable medium having stored thereon instructions which when executed by a processor cause the processor to perform the method of:
   in response to a request to access a content part of a distribution version of a secured composite document, determining that the content is not already decrypted and available in an in-memory version of the composite document stored in a transient memory, the distribution version being implemented as a flat file database located in a permanent storage and the in-memory version being a new database stored in the transient memory for a particular user based upon his access rights;

retrieving the content part from the distribution version of the secured composite document;

decrypting the content part using an access key in the distribution version of the secured composite document that corresponds to the particular user;

erasing one or more other content parts previously decrypted from the distribution version of the secured composite document and stored in the transient memory, wherein the one or more other content parts are identified as candidates for erasing based on a pre-determined criterion; and storing the content part in the transient memory when an amount of transient memory made available by the erasing is equal to or greater than an amount of memory space needed to store the content part in the transient memory.

17. The non-transitory computer-readable medium of claim 16, wherein the pre-determined criterion is one or more of lowest security risk, user access privilege to modify, longest idle time for each content part, or longest path from the one or more other content parts.

18. The non-transitory computer-readable medium of claim 16, further comprising before erasing:

encrypting each of the other parts that were modified while in the transient memory;

signing each of the other parts that were modified; and storing, in the distribution version of the secured composite document, encrypted versions of each of the other parts that were modified.

* * * * *